US010789257B2

(12) United States Patent
Dhollander et al.

(10) Patent No.: US 10,789,257 B2
(45) Date of Patent: Sep. 29, 2020

(54) SYSTEM AND METHOD FOR SIMILARITY SEARCH IN PROCESS DATA

(71) Applicant: D Square n.v., Hasselt (BE)

(72) Inventors: Thomas Dhollander, Zwijnaarde (BE); Bert Baeck, Temse (BE); Stijn Meganck, Deurne (BE)

(73) Assignee: D SQUARE N.V., Hasselt (BE)

(*) Notice: Subject to any disclaimer, the term of this patent is extended or adjusted under 35 U.S.C. 154(b) by 421 days.

(21) Appl. No.: 14/579,432

(22) Filed: Dec. 22, 2014

(65) Prior Publication Data

US 2015/0178286 A1 Jun. 25, 2015

Related U.S. Application Data

(60) Provisional application No. 61/919,911, filed on Dec. 23, 2013.

(30) Foreign Application Priority Data

Apr. 28, 2014 (EP) .................................. 14166255

(51) Int. Cl.
*G06F 16/2457* (2019.01)
*G05B 19/418* (2006.01)
*G06F 16/903* (2019.01)

(52) U.S. Cl.
CPC . *G06F 16/24578* (2019.01); *G05B 19/41875* (2013.01); *G06F 16/903* (2019.01); *Y02P 90/22* (2015.11); *Y02P 90/86* (2015.11)

(58) Field of Classification Search
CPC .......... G06F 17/3053; G06F 16/24578; G06F 16/903; G05B 19/41875

USPC ......................................................... 707/728
See application file for complete search history.

(56) References Cited

U.S. PATENT DOCUMENTS

| 6,754,388 B1* | 6/2004 | Foslien | G06F 17/30539 |
| | | | 382/209 |
| 6,795,798 B2* | 9/2004 | Eryurek | G05B 23/0254 |
| | | | 700/29 |
| 6,853,920 B2* | 2/2005 | Hsiung | G05B 15/02 |
| | | | 702/1 |

(Continued)

FOREIGN PATENT DOCUMENTS

EP 2 299 345 A1 3/2011

OTHER PUBLICATIONS

"Pattern Matching in Historical Data", Michael C. Johannesmeyer et al., AICHE Journal, vol. 48, No. 9, Sep. 2002, p. 2022-2038.

(Continued)

*Primary Examiner* — Miranda Le
(74) *Attorney, Agent, or Firm* — 24IP Law Group USA, PLLC; Timothy R DeWitt

(57) ABSTRACT

An industrial process analysis system is disclosed The system comprises a process data connection device for the acquisition of process data from process data source, an input system for receiving at least one search instruction, an indexing system for indexing the process data to create a set of indexed process data a data processing device for processing the at least one search instruction to create a search parameter set and comparing distances of members of the search parameter set with corresponding members of the indexed process data to obtain a similarity value; and an output device to display results based on the similarity value.

11 Claims, 24 Drawing Sheets

(56) References Cited

U.S. PATENT DOCUMENTS

| | | | | |
|---|---|---|---|---|
| 6,859,755 | B2* | 2/2005 | Eryurek | G05B 23/0213 700/117 |
| 6,973,389 | B1* | 12/2005 | Mountassir | G06Q 10/04 702/22 |
| 7,007,019 | B2* | 2/2006 | Kanno | G06F 17/30696 |
| 7,272,707 | B2* | 9/2007 | Liu | G06F 11/3452 706/19 |
| 7,472,099 | B2* | 12/2008 | Nishiuma | G06Q 10/04 706/14 |
| 7,529,634 | B2* | 5/2009 | Mitsutake | H01L 22/20 438/17 |
| 7,711,440 | B1* | 5/2010 | Campbell | G05B 19/4183 700/19 |
| 8,010,470 | B2* | 8/2011 | Jackson | G06N 99/005 706/20 |
| 8,568,145 | B2* | 10/2013 | Jastrzembski | G06Q 10/10 434/176 |
| 8,751,432 | B2* | 6/2014 | Berg-Sonne | G05B 15/02 706/12 |
| 8,768,634 | B2* | 7/2014 | Fu | G01H 1/003 702/183 |
| 9,002,854 | B2* | 4/2015 | Baum | G06F 17/30551 707/746 |
| 9,110,945 | B2* | 8/2015 | Jain | G06F 17/30427 |
| 9,152,671 | B2* | 10/2015 | Lin | G06F 17/30545 |
| 9,275,131 | B2* | 3/2016 | Rao | G06F 17/30625 |
| 9,361,329 | B2* | 6/2016 | Chen | G06F 17/30312 |
| 9,477,784 | B1* | 10/2016 | Bhave | G06F 11/3476 |
| 9,674,058 | B2* | 6/2017 | Shimasaki | G06F 17/30303 |
| 9,678,845 | B2* | 6/2017 | Suzuki | G05B 23/0208 |
| 2003/0139905 | A1* | 7/2003 | Helsper | G06F 11/3006 702/182 |
| 2006/0173668 | A1* | 8/2006 | Haigh | G06K 9/00523 703/17 |
| 2007/0011123 | A1* | 1/2007 | Ruml | G06N 5/003 706/45 |
| 2009/0018994 | A1* | 1/2009 | Hajdukiewicz | G06F 17/30551 |
| 2009/0037772 | A1* | 2/2009 | Wegerich | G05B 23/0254 714/26 |
| 2009/0172059 | A1* | 7/2009 | Cormode | H04L 43/00 708/274 |
| 2010/0033486 | A1* | 2/2010 | Dahlen | G06T 11/206 345/440.2 |
| 2010/0179930 | A1* | 7/2010 | Teller | G06N 20/00 706/12 |
| 2010/0211192 | A1* | 8/2010 | Stluka | G06F 17/30551 700/12 |
| 2010/0293175 | A1* | 11/2010 | Vadrevu | G06F 16/951 707/759 |
| 2011/0213488 | A1* | 9/2011 | Suzuki | G05B 23/0272 700/109 |
| 2012/0143575 | A1* | 6/2012 | Imhof | G01V 11/00 703/2 |
| 2012/0197911 | A1* | 8/2012 | Banka | G06F 17/30864 707/752 |
| 2013/0103657 | A1* | 4/2013 | Ikawa | G06F 17/30985 707/693 |
| 2014/0040276 | A1* | 2/2014 | Chen | G06F 17/30339 707/746 |
| 2014/0365271 | A1* | 12/2014 | Smiley | G06Q 10/0635 705/7.28 |

OTHER PUBLICATIONS

"Hierarchical Clustering Schemes," Johnson, Stephen C., Psychometrika, 1967, p. 241-254.

* cited by examiner

Figure 16

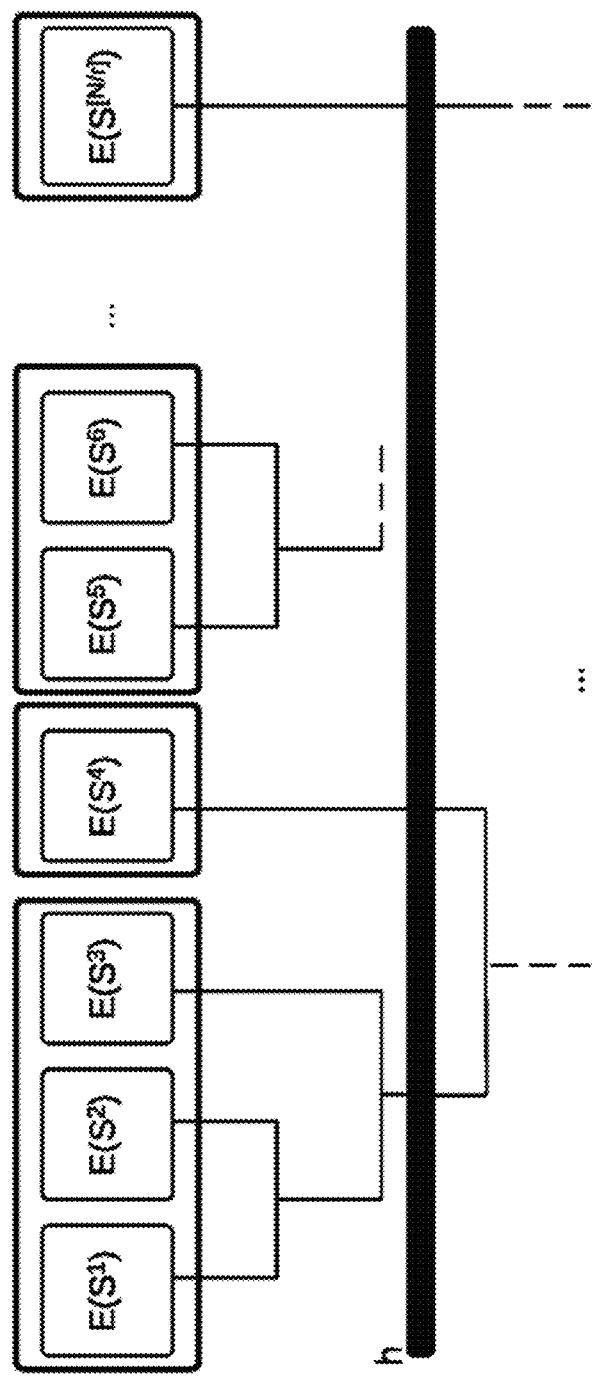

SYSTEM AND METHOD FOR SIMILARITY SEARCH IN PROCESS DATA

CROSS REFERENCE TO RELATED APPLICATIONS

This application claims priority to and benefit of U.S. Provisional Application No. 61/919,911 entitled "System and Method for Similarity Search in Process Data" filed by the same inventors on Dec. 23, 2013, and European Patent Application No. 14 165 255.1 "System and Method for Similarity Search in Process Data" filed by the same inventors on Apr. 28, 2014.

The aforementioned patent applications are hereby incorporated by reference in their entirety.

BACKGROUND OF THE INVENTION

Field of the Invention

This disclosure relates to a system and method for a similarity search in process data obtained from an industrial process analysis system. More particularly, this disclosure relates to the use of a system and method which acquires process data from multiple process data sources from within an industrial plant on a time series basis, displays these process data graphically on an output device and enables a user to define a search instruction for searching the process data.

Brief Description of the Related Art

Currently, different types of process data are stored and visualized in separate applications. The process data from an industrial process is collected in a so-called data historian, such as those provide by Wonderware, Aspentech, Osisoft, etc. An operator selects a time frame and a subset of tags from the data historian to visualize the process data in a trend viewer. The tags are unique identifiers of sensors or other measurement devices and are also unique identifiers of the corresponding data set collected from the sensor or other measurement device. The operator uses another program to access alarm data in an event logging system over the same time frame.

The historical process data is accessible on a timestamp basis, i.e. each item of data in the data historian (or event logging system) has a time of measurement (or time frame over which the measurements are performed) associated with the item of data.

The operators cannot easily using the prior art systems retrieve:
  Situations similar to a defined situation of interest.
  Actions performed during such similar situations.
  Downstream events during a similar situation (potential consequences).
  Upstream events during a similar situation (potential causes).

As a result, the information on which the operator needs to base his or her decisions is currently limited to a contemporary snapshot of a small subset of the available process data.

Analysis support methods, like the system disclosed in European patent EP 2 299 345 A1 entitled "Plant Monitoring Control Device and Event Analysis Support Method" provide methods for combining the process data from multiple data sources related to a specific event. These methods only allow analyzing data within a confined time frame and fail to take advantage of the vast amount of the historical process data present in many industrial plants.

The system and method of the current disclosure enable the operators in an industrial plant to:
  Search for situations based on search instructions, such as signal characteristics, visual resemblance, etc.
  Analyze downstream events during similar situations. This analysis allows predicting future behavior in the industrial plant based on past behavior of the industrial process.
  Analyze upstream events during similar situations. This allows finding causal impact factors for an observed situation.
  Learn optimal actions based on actions performed in similar situations and the effects of those actions in those situations.

Further prior art includes the method disclosed in "Pattern Matching in Historical Data", Michael C. Johannesmeyer et al., AICHE Journal, vol. 48, no. 9, September 2002, p. 2022-2038. There are several differences to this prior art method compared to the method described in this disclosure:
  The method described by Johannesmeyer operates by preprocessing the entire historical data whenever a query is performed. This requires significant computation effort at the time of performing the query and limits the performance of the method.
  The preprocessing of the data in Johannesmeyer is dependent on the actual properties (length, number of variables) of the query. This implies that even when only small changes are made to a previously performed query, the preprocessing done for the previous query cannot be reused and an entire new preprocessing step is needed.
  A multivariate query in this related art is regarded as a single entity, which implies that every item in a query has the same importance when matching the query to a potential candidate. No individualization or weighting of the variables or of different parts of the query is possible using these prior art methods.
  Johannesmeyer makes assumptions about the underlying status of the process, such as whether the process is upset or an anomaly has occurred or whether the process is in normal operation, as Johannesmeyer needs to set an alarm condition. This means that Johannesmeyer only defines similarity measures which are only useful for a particular or select situation related to the process operation and not useful for more generic queries which are not related to a particular process status.

The system and method of the current disclosure do not require any additional overhead at query time, as all of the preprocessing of the data is performed by a separate indexing system prior to performing of the queries. Furthermore, any of the queries (re-)using indexed variables can reuse the existing index and require no further preprocessing. More particularly, a query consisting of changes made to a previously performed query can reuse the existing index. As an additional capability, the system and method of the current disclosure regard a multivariate query as a combination of local items, which can all be individualized separately (or globally) with appropriate weighting factors attached to the local items. Furthermore, it is possible to search for any situation regardless of the underlying process status.

The system and method of the current disclosure enable the operators in an industrial plant to:
  Search for situations most similar to a previously unseen situation, and not just pre-defined anomalous situations.

Perform individualization on the different items inside a query

Allow to iterate searching for matches to a particular situation by emphasizing different parts of the query without loss of performance As a non-limiting example, assume an operator selects a situation concerning two temperature variables T1 and T2, corresponding to temperatures at different levels of a vessel, that both show peaks approximately a minute apart. The operator can first search this situation and then perform searches in which the operators gives more importance to either one of the peaks, without requiring any extra preprocessing of the data relating to the two temperature variables. As a further option, the operator can also identify using the method of the current disclosure for a situation in which the presence of both peaks within a short period has never occurred, but both peaks individually appear multiple times. The operator can weight the temperature variable data relating to either one of the peaks and then depending on the emphasis given by the operator those situations can still potentially be identified.

Systems that are of interest as data sources for use in the present disclosure include but are not limited to:

Data Historians Systems (DHS) are software applications that log or historize data. A PIMS or Process Information Management System is a DHS that logs process measurements. A LIMS or Laboratory Information Management System is a DHS that logs laboratory information, such as analysis results. The DHS may be implemented with flat files, relational databases, or dedicated time series databases. The Osisoft PI system (http://www.osisoft.com), the Aspen-IP21 system (http://www.aspentech.com) and the Honeywell PHD system (http://hpsweb.honeywell.com/Cultures/en-US/Products/OperationsApplications/InformationManagement/UniformancePHD) are examples of known data historian systems.

Data from the DHS is often visualized using trend viewer.

Event logging Systems (ELS) are systems that register process events of interest (maintenance, incidents, failures, alarms, etc.). Process Logbook Systems (PLS), Computerized Maintenance Management Systems (CMMS) and Incident Management Software Systems (IMSS) are examples of Event Logging Systems.

Process Logbook Systems (PLS) are paper books or software applications for recording (logging) states, events or simply conditions in production plants. Depending on company policies, various information such as key measurements, analysis results, contractors, failures, maintenance activities or production information may be entered in the logbook.

Computerized Maintenance Management Systems (CMMS) are software packages that maintain a computer database of information about an organization's maintenance operations, i.e. CMMIS—computerized maintenance management information system. This information is intended to help maintenance workers do their jobs more effectively (for example, determining which ones of the machines running the industrial process require maintenance and which ones of the storerooms contain the spare parts needed by the machines) and to help management make informed decisions (for example, calculating the cost of machine breakdown repair versus preventive maintenance for each machine, possibly leading to better allocation of resources). CMMS data may also be used to verify regulatory compliance. Examples of computerized maintenance management systems include SAP PM (http://www.sap.com) and Maximo (www.ibm.com/software/products/us/en/maximoassetmanagement/).

Incident Management Software Systems (IMSS) are designed for collecting consistent, documented incident report data. Many of these products include features to automate approval process of an incident report or a case investigation. Additionally the IMSS may automatically send notifications, assign tasks and escalations to appropriate individuals depending on the incident type, priority, time, status and custom criteria. Modern products provide the ability for the operators to configure incident report forms as needed, create analysis reports and set access controls on the process data.

Batch information system (BIS) store which grade or batch is being produced in a plant at any given time.

SUMMARY OF THE INVENTION

A process analysis system and method is disclosed. The system and method of this disclosure can be used in a process plant equipped with at least one process data source containing process data obtained from an industrial process. A data connection device is used to acquire process data on a time series basis from the process data sources and said data is displayed on an output device to the user. The user can define a search instruction using an input system.

The process data connection device is also used to input and acquire data from an index database. If the necessary index is not present the data processing device creates the index by means of an indexing system and stores the index in the index database by means of the data connection device. The data processing device creates a search parameter set of the user-defined search instruction and by means of the data connection device retrieves the relevant process data from the index database. The data processing device further calculates a cumulative distance between the search parameter set and each member of the index database. The results are displayed to the user on an output device.

In one aspect of the invention, the industrial process analysis system comprises a process data connection device for the acquisition of process data from one or more process data sources, an indexing system for indexing the process data to create a set of indexed process data, an input system for receiving at least one search instruction, wherein the search instructions comprises a search parameter set of one or more weightable search parameters. The industrial process analysis system also includes a data processing device for processing the at least one search instruction to create a search parameter set and comparing distances of members of the search parameter set with corresponding members of the indexed process data to obtain a similarity value, and an output device to display results based on the similarity value.

The indexing system indexes the process data before the search instruction is entered and the entry of the search instruction does not require a complete re-indexing of the process data to be carried out, which saves computer resources. There is no need to re-index the process data on the entry of the search instruction. Any previously indexed parameters in the process data do not need to be re-calculated.

In one further aspect of the disclosure, the indexing system is adapted to divide the process data into a plurality of time slices and calculating index values for the time slices characteristic of the process data in the time slice. This reduces the amount of data that needs to be stored, which in addition to saving storage space enables the process data to be analyzed more quickly.

In a further aspect of the invention, the input system can further be adapted to apply a weighting to one or more of the weightable search parameters in the search parameter set. This allows the user to place particularly emphasis on particular ones of the search parameters that are considered to be more important.

This disclosure also teaches a method of comparing at least one search instruction with process data obtained from an industrial process. The method comprises converting the search instruction to a search parameter set of weightable search parameters, accessing a set of indexed process data obtained by indexing the process data, and comparing the search parameter set with the indexed process data by calculating at least one distance between members of the search parameter set and corresponding members of the indexed process data to obtain a similarity value. One or more results based on the similarity value can be output.

DEFINITIONS AND NOTATIONS

Certain terms and notations used throughout this document are given meanings as defined below.

Tag: A uniquely identified measurement point in the plant, allowing all systems (such as a data historian) in the plant to consistently identify the specific device. Tags may represent sensors, actuators, controller signals, set points, etc. The process data can be retrieved from the data historian in the form of a tuple [timestamp, Tag, value]. All data relevant to a given tag is the set of all tuples [timestamp, Tag, value] containing the given Tag.

Event identifier (abbreviated EID): A unique identifier of a set of related events. An event itself may relate to multiple tags, devices, equipment, etc. For instance, the event identifier "Maintenance Pump300" could indicate all maintenance events on Pump300. As another example, the event identifier "Alarm H TI001" could indicate all high alarms for the tag TI001. An event can be retrieved from the data logger in the form of a tuple [Event identifier, start time, stop time]. All data relevant for a given event identifier is the set of all tuples [Event identifier, start time, stop time] containing the given event identifier. Instantaneous events are represented by a tuple with equal start time and stop time.

Signal identifier: A generic placeholder for either a tag or event identifier. A signal refers to the data relevant for the signal identifier.

Both a tag and event identifier (and hence a signal identifier) can be represented numerically by an integer value. To simplify this description, when the distinction between the tag and the event identifier is not important, a set containing both tags and event identifiers is denoted as a single set of integers 1, ..., m.

BRIEF DESCRIPTION OF THE DRAWINGS

For a more complete understanding of the present invention and the advantages thereof, reference is now made to the following description and the accompanying drawings, in which:

FIG. 16 shows an example of comparing a search parameter set with members in the index database using a fixed indexing approach.
FIG. 24 shows an example of the grouping procedure for the variable indexing approach.

DETAILED DESCRIPTION

Figure 1:
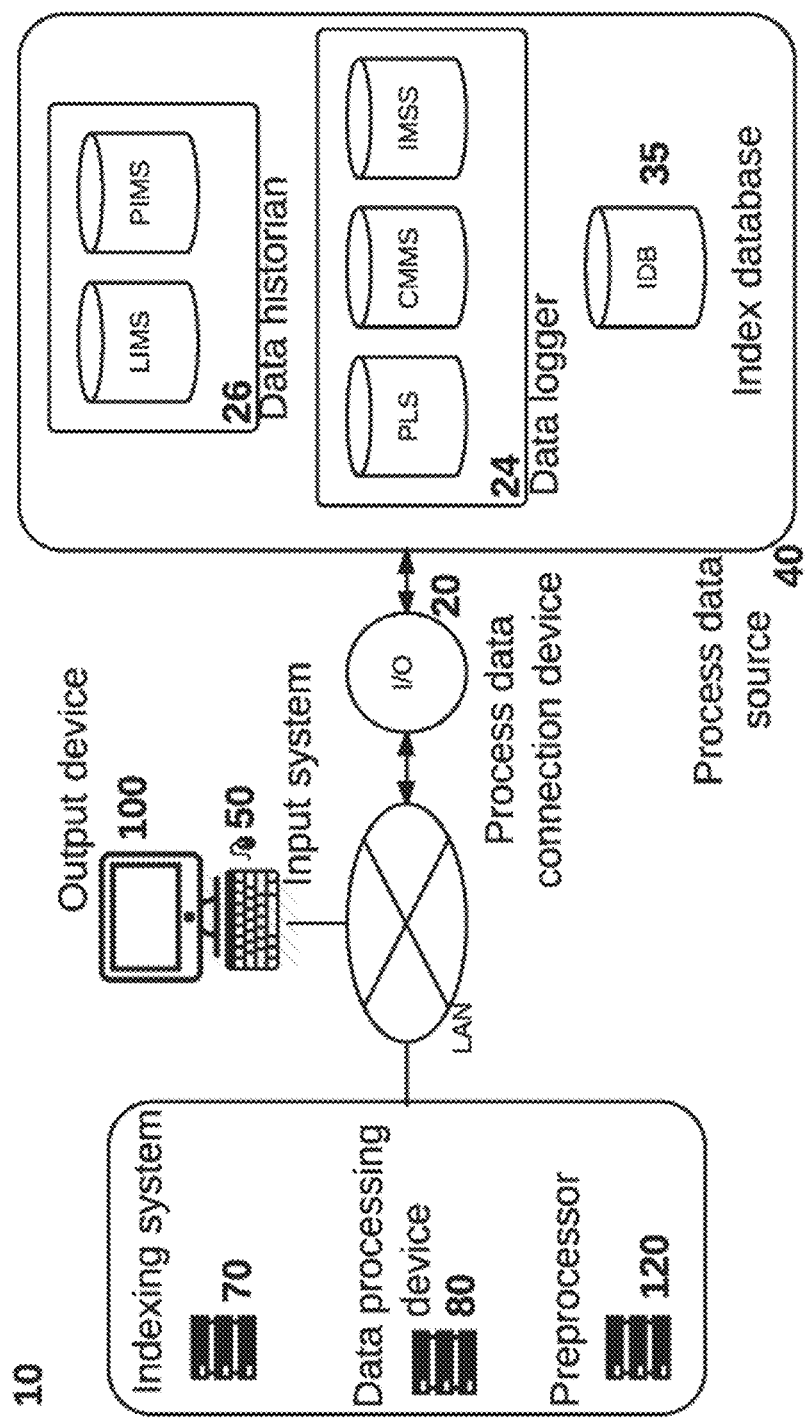
FIG. 1 shows a configuration diagram.

FIG. 1 shows an industrial process analysis system 10. The industrial process analysis system 10 of the disclosure can be used for analysis of multiple different types of industrial processes, including but not limited to chemical refineries, power plants, pharmaceutical manufacturing, car plants, and food production.

The industrial process analysis system 10 comprises a process data connection device 20 connected to a plurality of data sources 40 through a local area network (LAN) 15, which can be formed by an Ethernet cable connection or a Wi-Fi network using the 802.xx standard, but this is not limiting of the invention. The process data connection device 20 enables the acquisition of process data 30 and is connected to at least one of the process data sources 40. Example of the data sources 40 include, but are not limited to a data historian system 26 or a data logger 24.

The industrial process analysis system 10 further comprises an input system 50 with a computer display 51 and at least one device 52 for user input allowing an operator to create one or more search instructions 60. An index database 35 contains indexed process data 30 and a data processing device 80 is used to process the at least one search instruction 60 and compare the search instructions 60 with the process data 30. An output device 100 with a display 101 is used to display the results of the comparison, as will be described later. The input system 50 and the output device 100 are connected to the data processing device 80 through the network and exchange information using the OSI layer 7 HTTP or HTTPS protocols. It will be appreciated that the input system 50 and the output device 100 might be identical.

A pre-processor 120 is incorporated into the industrial process analysis system 10 for pre-processing the process data 30. The pre-processing of the process data 30 includes, but is not limited to, interpolation of the process data 30 to obtain equidistantly sampled data points and will be explained later. An indexing system 70 is present for creating the indexed process data, from the processed data 30 and constitutes the index database 35.

Figure 2:
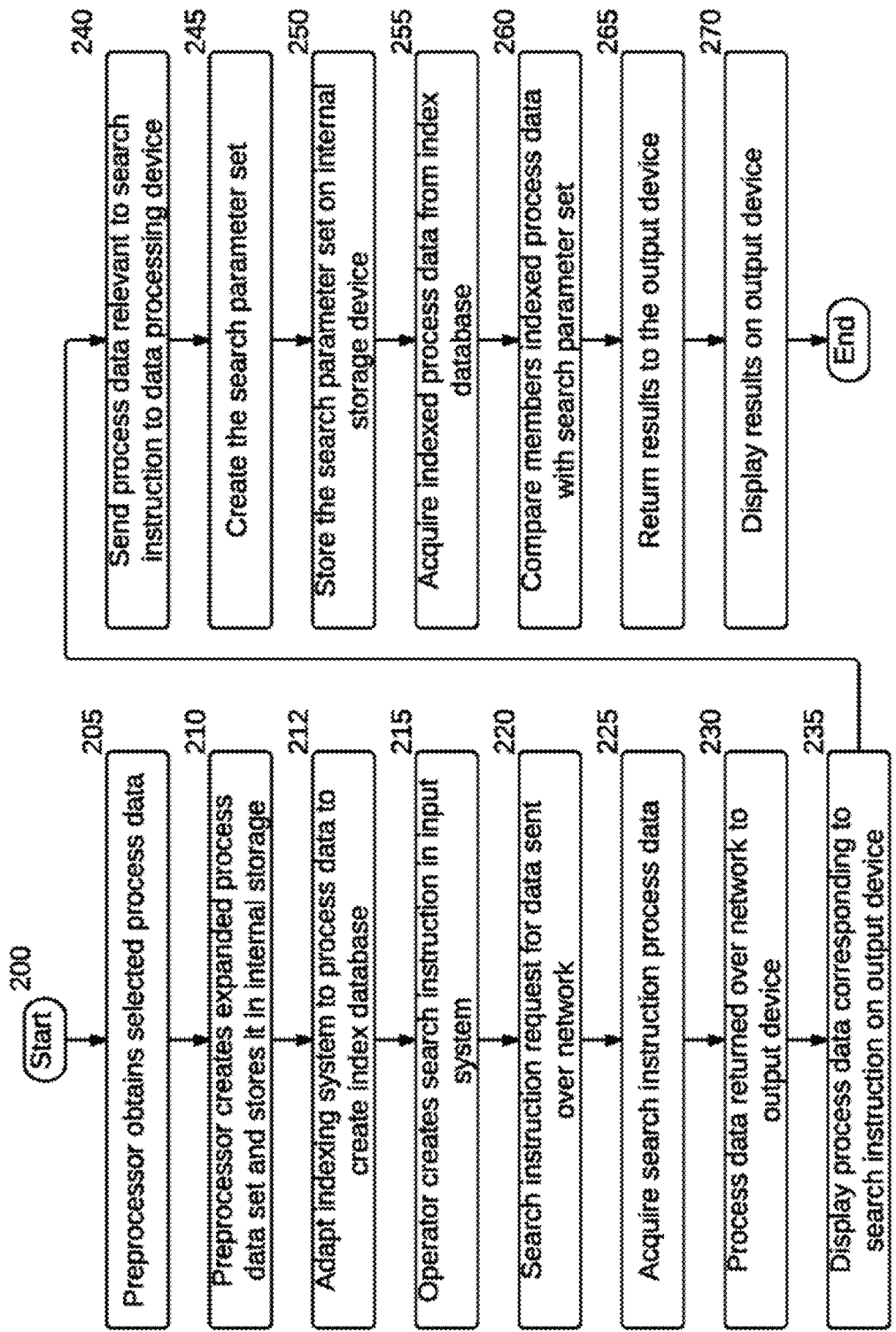
FIG. 2 shows a flow diagram of the method.

FIG. 2 shows a typical method using the teachings of this disclosure. The method starts at 200 and in a preprocessing phase 205 a preprocessor 120 obtains the process data 30 from selected ones of the process data sources 40 and in step 210, creates an expanded process data set 32. The expanded process data set 32 is stored on the internal storage. In step 212 an indexing system 70 is adapted to the historical process data 30 to create an index database 35, as will be explained in connection FIGS. 10 and 11. The operator enters in step 215 and by means of the input system 50 creates a search instruction 60 comprising a selected time frame and a set of selected signal identifiers, which are of interest to the operator.

In step 220 the input system 50 sends the created search instruction 60 as a request over the network 15 to the process data connection device 20 connected to the process data source 40. The process data connection device 20 acquires in step 225 the process data 30 from the corresponding process data source 40. The acquired process data 30 is sent back in step 230 over the network 15 to the output device 100 and is displayed in step 235 on the computer display 101. Further requests and acquisition of process data 30 is possible until the operator decides that the process data 30 currently displayed satisfies an interesting search instruction 60. This decision is made by the operator based on his or her experience and the issues being investigated. The data relevant for the search instruction 60 is sent in step 240 over the network 15 to the data processing device 80, which creates in step 245 a search parameter set 90 and stores, in step 250, the search parameter set 90 on the internal storage device. The data processing device 80 acquires in step 255 the indexed process data over the network 15 through the process data connection device 20 from the index database 35 and compares in step 260 the corresponding members of the indexed database 35 with the search parameter set 90 to obtain a similarity value 105, as will be explained later. The results 110 of the comparison are sent in step 265 over the network 15 to the output device 100 and are displayed in step 270 to the operator.

The method of this disclosure assumes given a set of predetermined parameters and options.

There are two options to creating the indexing system 70, namely fixed indexing or variable indexing. These two options will now be explained.

Fixed indexing approach: The indexing system 70 is based on summarizing the process data 30 by storing a small set of parameters of the process data 30 per signal identifier and per time slice. In this approach, the time slice has a fixed size, i.e. is of identical length. The fixed size of the time slices (which are non-overlapping windows) is defined as the index resolution r. Typically the stored set of parameters contains significantly fewer values than the number of those parameters, which are contained in the process data 30 time slice. The store of all of the parameters of all of the time slices make up the index database 35. In other words, the index resolution (r) is the granularity at which information about the tags and the event identifiers (signal identifier) is stored in the index database 35.

Variable indexing approach: The indexing system 70 in this approach is also based on summarizing the historical data 30 by storing a small set of parameters per signal identifier and per time slice. The time slices in this approach have variable sizes, which are integer multiples of a minimum size r. The minimum size of the time slice is defined as the index resolution r. Typically the stored set of parameters contains significantly less values than the number of those parameters, which are contained in the process data 30 time slice. The store of all of the parameters of all of the time slices together with the length of each of the time slices makes up the index database 35.

It will be appreciated that the fixed indexing approach is a special case of the variable indexing approach in which all time slices have the same length r. The decision on the size of each time slice can be based on different criteria including, but not limited to, swinging door compression algorithms, fixed-width, piecewise linear fits, etc.

Indexing function ($f$): The generation of the parameters (parameterization) of each time slice is done by use of an indexing function, defined as $f$. This indexing function ($f$) transforms all of the measured values within the time slice to a different, and typically smaller, numerical representation. In other words the indexing function ($f$) defines which information about the tags and the event identifiers (i.e. signals) is stored in the index database 35. A non-limiting example of an indexing function is one that returns maximum and minimum value of all measured values within the time slice. The length of the time slice is also recorded in the index database 35 as a multiple of the index resolution r (i.e. a length 2 means that the time slice has a length 2*r).

Index representation function ($irf$): The index representation function $irf$ is application of the indexing function $f$ without adding the length of the time slice. The function is only defined on time slices of length r. In other words the index representation $irf$ function calculates the same representation as the indexing function $f$, but does not return the length (l) of its argument.

Distance function ($\psi$): A (possible non-metric) distance function, such as the Euclidean distance or dynamic time warping distance, used to calculate the distance between members of the search parameter set 90 and elements in the indexed process data 35.

Maximum dissimilarity ($\epsilon$): A user defined value, indicating the maximum cumulative distance between a search instruction 60 and the corresponding members in the index database 35.

The search instruction 60 is created by means of the input system 50 as explained later. The search instruction 60 can be regarded as a (multivariate) time series subsequence Q over a time frame $[t_k, t_{k+l-1}]$ (or simply denoted as [k, k+l−1]), where l is the number of equidistant time values with a recorded value in the search instruction 60. In other words a search instruction 60 comprises values recorded at l fixed time value starting from $t_k$. Assume that m signal identifiers are part of the search instruction 60, then each of the signal identifiers can be denoted by 1, . . . , m and the search instruction 60 as:

$$Q=[Q[1], \ldots, Q[m]]$$

Each Q[i] is defined as $Q[i]=\{Q[i]_k, \ldots, Q[i]_{k+l-1}\}$ in which $Q[i]_j$ represents the value of the signal Q[i] at time $t_j$. So Q[i] consists of values recorded at times $t_k, \ldots, t_{k+l-1}$ from one specific signal denoted by signal identifier i.

Figure 3:
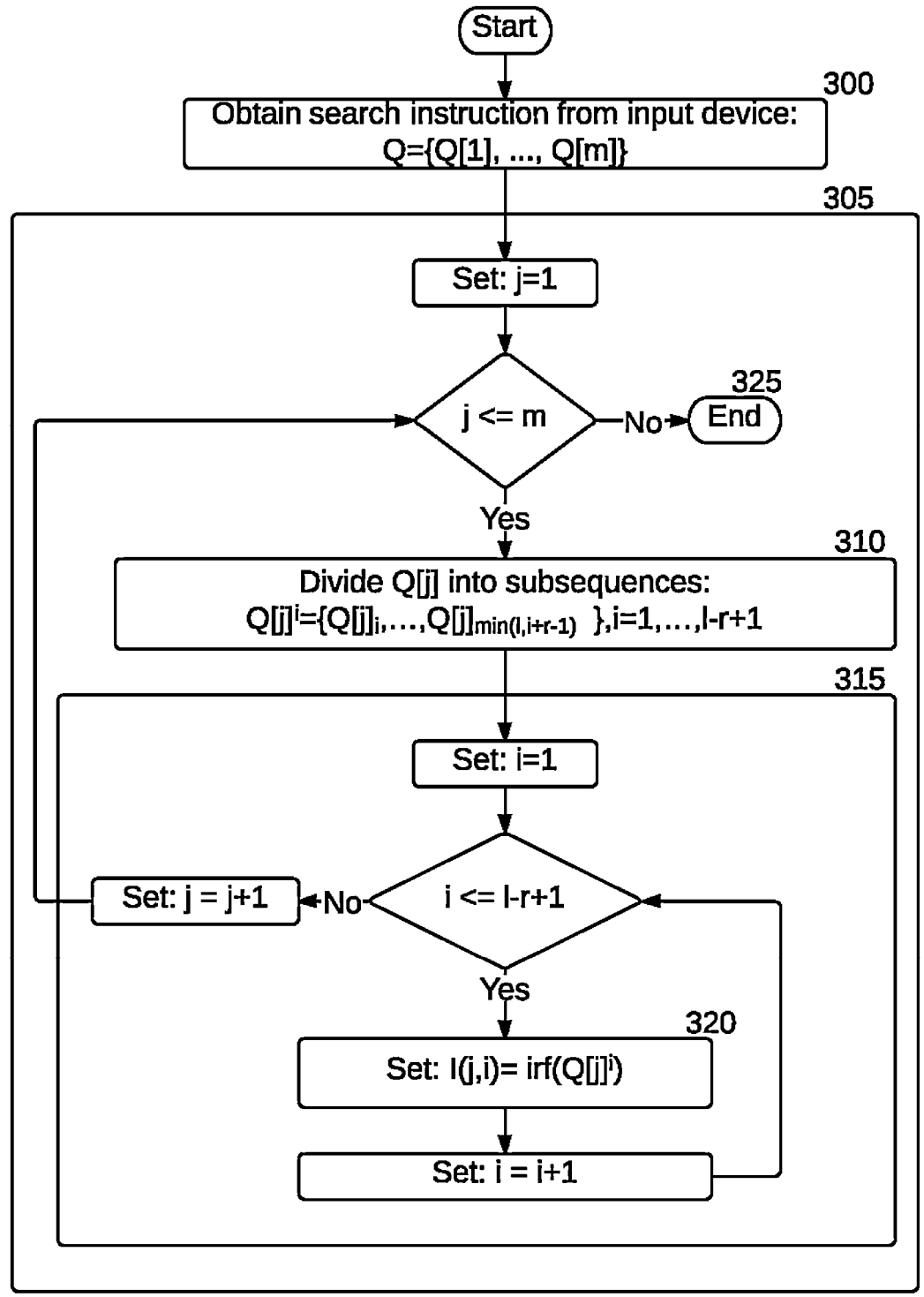
FIG. 3 shows construction of a search parameter set from a search instruction.

FIG. 3 shows a flow diagram of the method for converting the search instruction Q 60 to a search parameter set 90. In other words the search instruction Q 60 will be transformed in a condensed representation by parameterizing each time slice of size r, where r is equal to the index resolution. The method starts at 300 with the data processing device 80 receiving the search instruction Q 60 from the input device 50. Assume the search instruction 60 Q as defined above, the corresponding search parameter set is created as follows.

Assume given the index resolution r and an indexing system 70 using an indexing function $f$, as defined previously, and its corresponding index representation function $irf$. In step 305 an iterative procedure running over all signal identifiers j=1, . . . , m in the search instruction 60 is entered. For every time series subsequence Q[j], j=1, . . . , m in the search instruction 60, the following operations are performed. In step 310 the time series subsequence is divided in time slices of length r. This divides the time series subsequence into further subsequences $Q[j]^i=\{Q[j]_i, \ldots, Q[j]_{min(l,i+r-1)}\}$, i=1, . . . , l−r+1, where i is the number of time slices.

In step 315 another iterative procedure is entered running over each further subsequence $Q[j]^i$. For each subsequence $Q[j]^i$ in step 320 a parameterization is performed by applying the indexing representation function $irf$ and the result is stored as a matrix I(j,i):

$$I(j,i)=irf(Q[j]^i)=irf(\{Q[j]_i, \ldots, Q[j]_{i+r-1}\})$$

The method ends in step 325 when the complete matrix I has been filled up. The matrix I is the search parameter set 90 for the given search instruction 60 Q. In other words, the search instruction 60 Q comprising values recorded at fixed time values starting from $t_k$ from a number of signals Q[1], . . . , Q[m] is split into a plurality of time slices, with each one of the time slices containing r consecutively recorded measurements. The first subsequence for signal Q[j] is given by the first r measurements of Q[j] within the original search instruction, and so forth. For each of these time slices a set of parameters is calculated by applying the function $irf$ to the vector of all values in that time slice and the result of applying this function is stored in I.

In one aspect of the invention, the indexing function $f$ is a function which calculates the maximum and minimum values within a time frame formally defined as follows:

$$f: \mathbb{R}^n \to \mathbb{N} * \mathbb{R}^2$$

$$(x_1, \ldots, x_n) \mapsto \left(\frac{n}{r}, \min(x_1, \ldots, x_n), \max(x_1, \ldots, x_n)\right)$$

In other words, $f$ is a function that takes a set of n values from a given time slice as its input and outputs the length of that time slice divided by the index resolution r together with the minimum and maximum value within that time slice. Given this index function $f$ the corresponding index representation function is defined as:

$$irf: \mathbb{R}^r \to \mathbb{R}^2$$

$$(x_1, \ldots, x_r) \mapsto (\min(x_1, \ldots, x_r), \max(x_1, \ldots, x_r))$$

and thus we get a matrix:

$$I(j,i)=(\min(Q[j]_i, \ldots, Q[j]_{min(l,i+r-1)}), \max(Q[j]_i, \ldots, Q[j]_{min(l,i+r-1)}))$$

Figure 4:
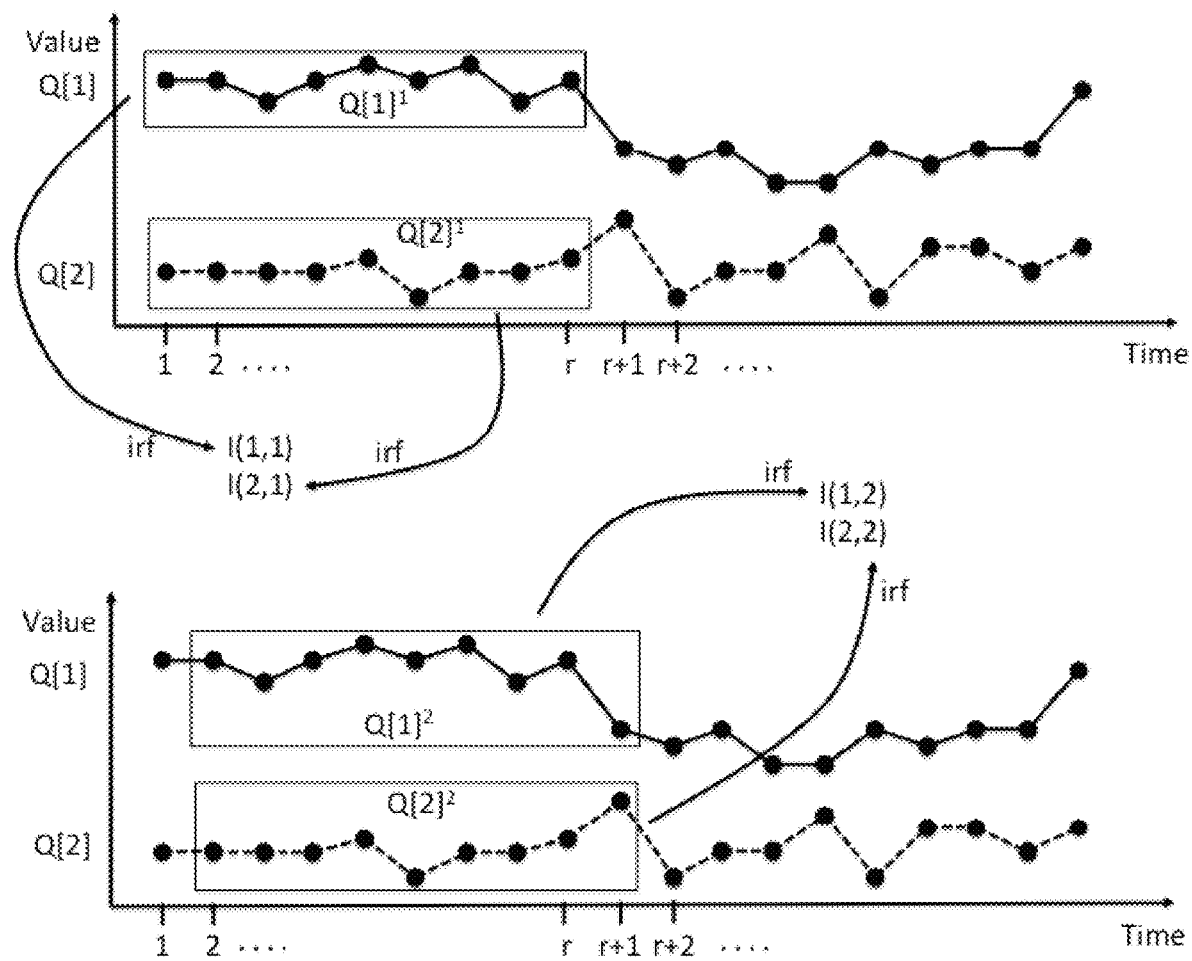
FIG. 4 shows an example of the construction of the search parameter set from a search instruction example.

FIG. 4 shows a simple example of creating the search parameter set 90 for a given one of the search instructions 60. It shows the search instruction 60 comprising two time series subsequences Q[1] and Q[2] that are indicated by the dots connected by a full line and dashed line respectively on FIG. 4. The top graph shows the first subsequences $Q[1]^1$ and $Q[2]^1$ on the time slice [1,r] visually by means of the square boxes 410-1 and 420-1. For these subsequences, the index representation function $irf$ is applied to generate two elements in the search parameter set I, namely I(1,1) and I(2,1). In the bottom graph the subsequences $Q[1]^2$ and $Q[2]^2$ over the next time slice [2, r+1] are shown by means of the surrounding boxes 410-2 and 420-2. Similarly, for these subsequences the index representation function $irf$ is applied to generate another two elements in the search parameter set I, namely I(1,2) and I(2,2).

The search parameter set 90 for this search instruction 60 will be the matrix I of dimension 2*(l−r+1) built up by applying the same index representation function $irf$ for each subsequent time slice.

In one further additional aspect of the disclosure, user defined weights $W[j]=\{W[j]_k, \ldots, W[j]_{k+l-1}\}$ associated with the search instruction 60 Q are applied to each individual point in the time series. For each element in the matrix I we create a corresponding aggregate weight W(j,i) as follows:

$$W(j,i)=\text{mean}(W[j]_i, \ldots, W[j]_{min(l,i+r-1)})$$

In other words the user can identify parts of the search instruction 60 Q as being more important by assigning higher weights to the corresponding measurements.

Next we describe how the search parameter set 90 and index database 35 are used to search for those sequences in the historical process data sources 40 that are similar to sequences represented by a search instruction 60. Define historical (indexed) process data 30 relevant to a search instruction 60 as the collection of historical (indexed) process data 30 of the signal identifiers present in the search instruction 60. The indexed process data 30 stored in the index database 35 stores parameterizations of non-overlapping time slices of the historical data 30, referred to as index elements. These non-overlapping time slices of the historical data 30 are compared with corresponding non-overlapping time slices of the search instruction 60 and their distances between the time slices of the historical data 30 and the corresponding non-overlapping time slices of the search instruction 60 distances are accumulated to create a cumulative distance.

For instance, given an index resolution r of 15 seconds and a search instruction 60 Q of 63 seconds the method compares the parameterizations of the first 4 non-overlapping time slices of the search instruction 60 (i.e. [1,15], [16,30], [31,45] and [46,60]) with each relevant set of non-overlapping index elements. The distances in this example are calculated on a time slice per time slice basis and accumulated to create the cumulative distance representing the dissimilarity between the search instruction 60 and the process data 30 corresponding to the index elements.

This method is performed for each set of parameterizations of non-overlapping windows in the search instruction 60 for which the first window starts before the given index resolution (i.e. {[2,16], [17,31],[32,46] and [47,61]}, . . . , {[14,28], [29,43] and [44,58]}). The start of the first window is termed the offset in the search instruction 60. The cumulative distance between the elements of the index database 35 and the time slices of the search instruction 60 is termed a match. The match can be represented as a tuple <offset, indexId, cumulative distance>, in which the offset is defined as above, i.e. start of the first window.

In the case of the fixed indexing approach, the indexId represents the first element in the process index database 35 used in the calculation of this cumulative distance. In the case of the variable indexing approach, the indexId is equivalent to the indexId as if the fixed indexing approach was used. On top of this an index mapping function $imf$ is defined which translates the indexId to the corresponding index element. It is possible to look at the fixed indexing approach as a special case of the variable indexing approach in which the index mapping function would be the identity, as noted above.

Figure 16:
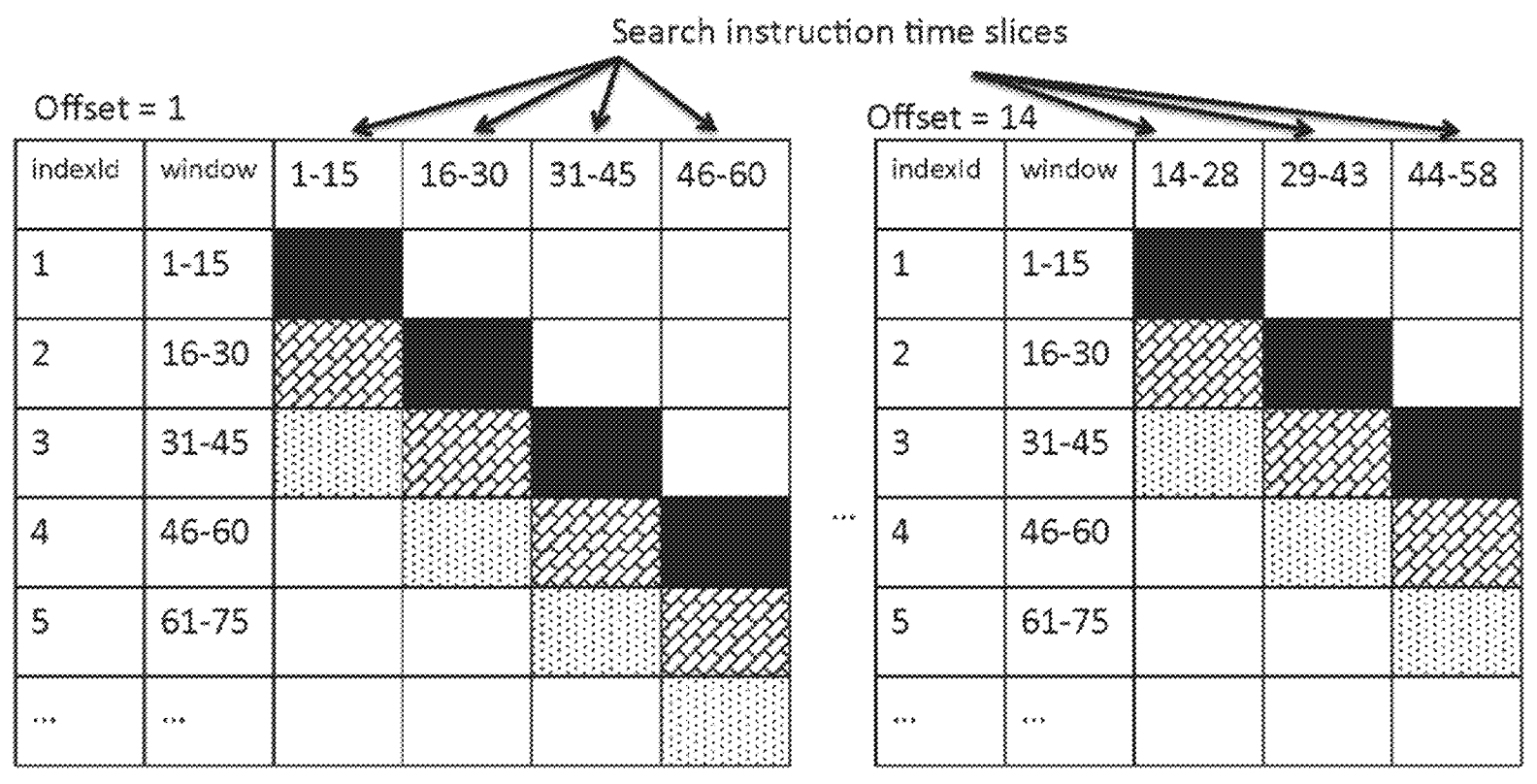

FIG. 16 shows a graphical representation of the comparison using a fixed indexing approach in which each square represents a distance between the parameterization of the time slice, given by the column header, of the search instruction 60 and the element, given by the row header, in the index database 35. The sum of distances in squares with the same pattern corresponds to the cumulative distances in a match.

Figure 21:
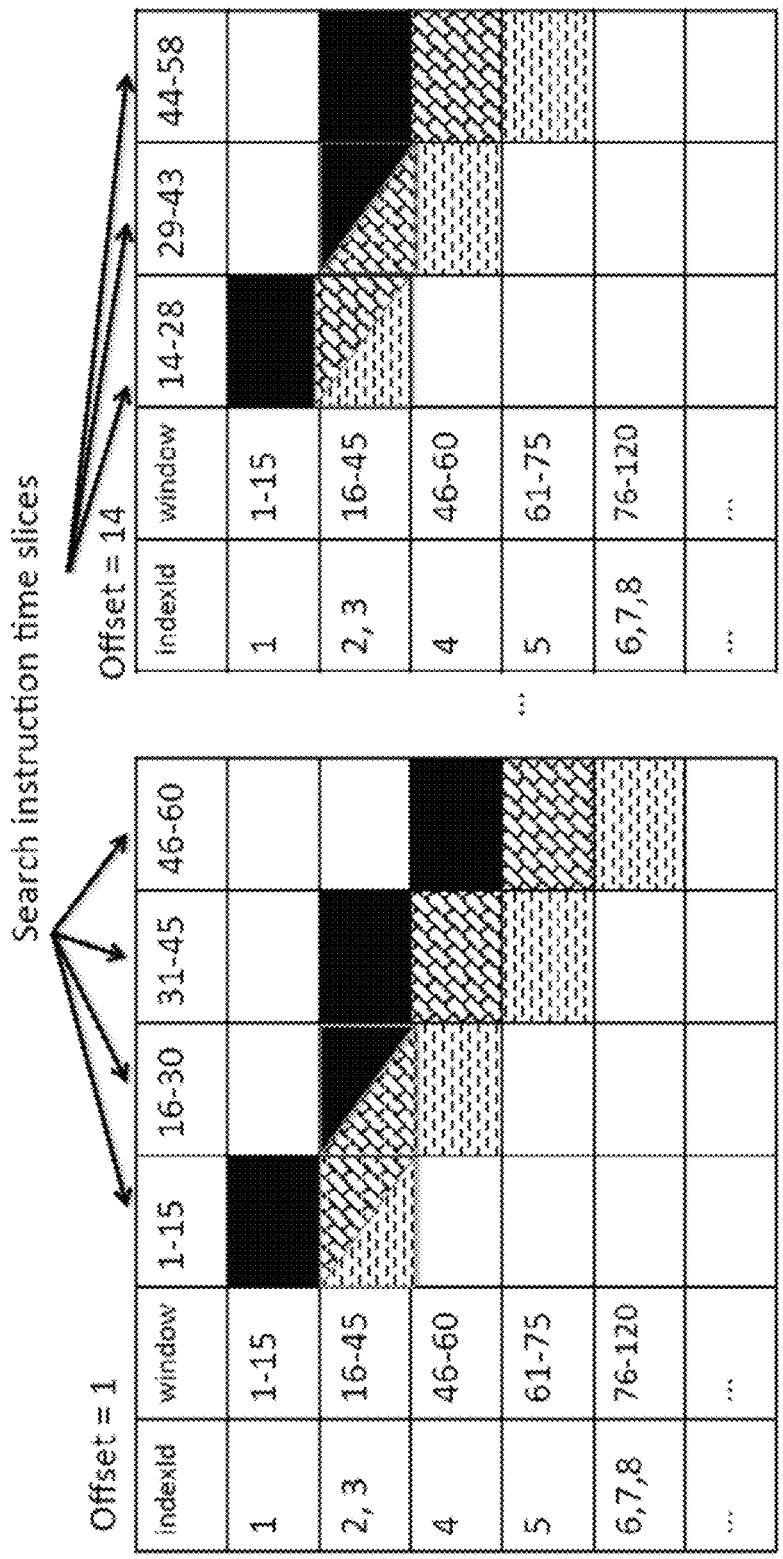
FIG. 21 shows an example of the comparing a search parameter set with members in the index database using a variable indexing approach.

FIG. 21 shows a graphical representation of the comparison using a variable indexing approach in which the second element in the index comprises the parameterization of 2*r consecutive measurements (16-30) of the process data and the fifth element comprises the parameterization of 3*r consecutive (76-120) measurements of the process data. Each square on FIG. 21 represents a distance between the parameterization of the time slice, given by the column header, of the search instruction 60 and the element, given by the row header, in the index database 35. The sum of distances in squares with the same pattern corresponds to the cumulative distances in a match.

Figure 5:
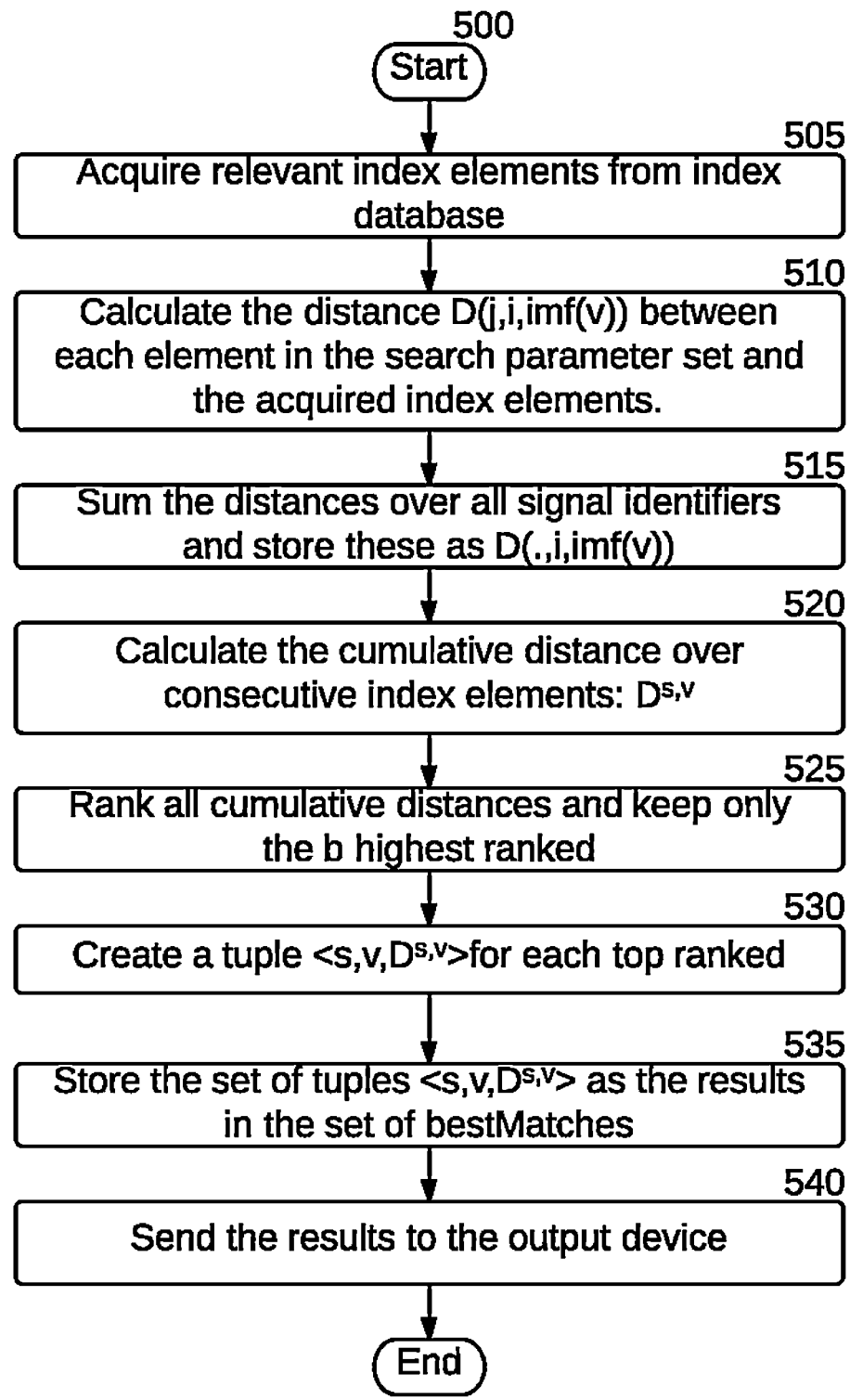
FIG. 5 shows a brute force search method.

FIG. 5 depicts a flow diagram for an exemplary implementation for comparing the search parameter set 90 with the corresponding members of the index database 35. The implementation starts in step 500 with the data processing device 80 receiving:

A search parameter set 90 I created from the search instruction 60 Q comprising the time series subsequences related to the signal identifiers j=1, . . . , m: Q[1]={Q[1]$_k$, . . . , Q[1]$_{k+l-1}$}, . . . , Q[m]={Q[m]$_k$, . . . , Q[m]$_{k+l-1}$} as explained previously;

A predetermined number b representing the number of best results to return;

A predetermined threshold $\epsilon$ representing the maximum cumulative dissimilarity between elements in the index database 35 and the search parameter set 90;

A distance function $\psi: \mathbb{R}^d * \mathbb{R}^d \to \mathbb{R}$;

The method for comparing operates as follows. In step 505 the relevant index elements $E(Q[j]^{imf(v)})$ (as defined later), in which j=1, . . . , m and v represents an indexId and imf is the index mapping function as described above are acquired from the index database 35. Note that in case of the fixed indexing approach the index mapping function $imf$ is the identity function. In step 510 an iterative procedure is entered in which for each element I(j,i) of the search parameter set 901, the distance using $\psi$ between I(j,i) and each element $E(Q[j]^{imf(v)})$ in the index database 35 is calculated and stored as D(j,i,imf(v)). In other words D(j, i,imf(v)) is the distance between the parameterization of the time slice of signal j starting at i and the imf(v)'th element of signal j in the index database 35.

Define D(.,i,imf(v)) as the following value:

$$D(., i, imf(v)) = \sum_j D(j, i, imf(v))$$

In step 515 calculate all of the values D(.,i,imf(v)). In other words calculate for each set of r consecutive time values in the search instruction 60, the sum of the distances D between the corresponding parameterization for each signal identifier j and the imf(v)'th element for the same signal identifier in the index database 35.

Define:

$$D^{s,v} = \sum_{m=0}^{m=\lfloor l/r \rfloor - 1} D(., s+m*r, imf(v+m))$$

In other words $D^{s,v}$ is the cumulative sum of distances between parameterizations of consecutive non-overlapping time slices in the search instruction 60 and corresponding elements in the index database 35 starting from the imf(v)'th element. In step 520 all values of $D^{s,v}$ are calculated. In step 525 all values of the cumulative distance $D^{s,v}$ are ranked from the lowest value to the highest value and the b (=required number of results) highest ranked ones are kept. In other words, those b values, which represent the lowest distances D, are selected. In step 530 for each of the b highest ranked cumulative distance values $D^{s,v}$ for which the value is lower than the maximum dissimilarity $\epsilon$, i.e. $D^{s,v} \leq \epsilon$ create a tuple $<s,v,D^{s,v}>$. In other words, the tuples are created if the cumulative distance is smaller than a user defined threshold $\epsilon$. In step 535 the created tuples $<s,v,D^{s,v}>$ are stored as the set of bestMatches. The method ends in step 540 when the results are sent to the output device 100.

Using the same exemplary implementation of the indexing function $f$ and index representation function $irf$ as above we can use the following as exemplary implementation for the distance function:

$$\psi: \mathbb{R}^2 * (\mathbb{N} * \mathbb{R}^2) \to \mathbb{R}$$

$$(x_1, x_2), \left(\frac{n}{r}, y_1, y_2\right) \mapsto \sqrt{(x_1 - y_1)^2 + (x_2 - y_2)^2}$$

This combination of this exemplary distance function and the index function $f$ guarantees that the calculated cumulative distances in bestMatches are lower bounds of the Euclidian distances between the search instruction 60 Q and the corresponding subsequences in the historical process data 30 corresponding to the elements in the set of bestMatches.

It will be appreciated that different implementations of the distance function are possible and that the teachings of the disclosure are not omitted to the use of Euclidean distances. Such different implementations include, but are not limited to correlation, variance, etc. The implementation of the different implementations opens possibilities to search for situations that are similar in shape (for instance a peak, a slow slope), but need not be similar in absolute value.

To include the weights in the search we adapt the distance function as follows:

$$\psi: \mathbb{R}^2 * (\mathbb{N} * \mathbb{R}^2) \to \mathbb{R}$$

$$(x_1, x_2, w), \left(\frac{n}{r}, y_1, y_2\right) \mapsto \sqrt[2]{(x_1-y_1)^2 + (x_2-y_2)^2} * w$$

in which w is the matching weight from W(j,i) corresponding to I(j,i)=($x_1,x_2$). In other words, mismatches in parts of the search instruction 60 with higher weights will be penalized in the cumulative distance.

Figure 18:
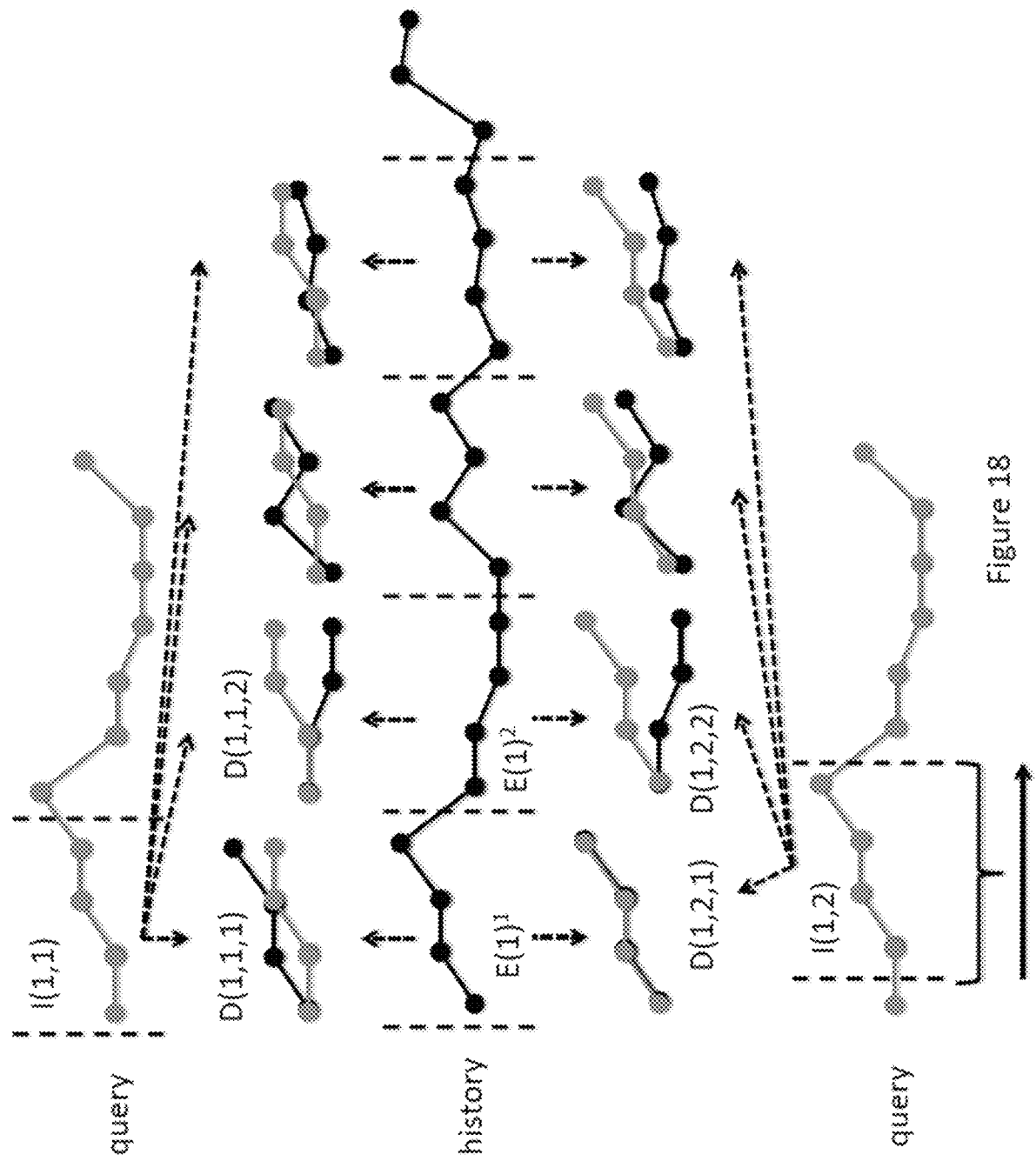
FIG. 18 shows a visualization of a method for calculation of cumulative distances between a search parameter set and elements from the index database.

FIG. 18 is a visualization of the comparison method. The top and bottom part of the figure represent two consecutive time slices of the search instruction 60 denoted by the dashed vertical lines. FIG. 18 further depicts the corresponding distances between the subsequences that need to be calculated. The calculations are done not on the raw data, but on the search parameter set 90 and the elements from the index database 35. For each of these time slices the corresponding element from the search parameter set 90 I is acquired. The distance between each element in the I(l,i) and each element E(l)$^{imf(j)}$ from the index database 35 is calculated and stored in D(l,i,imf(j)).

Figure 6:
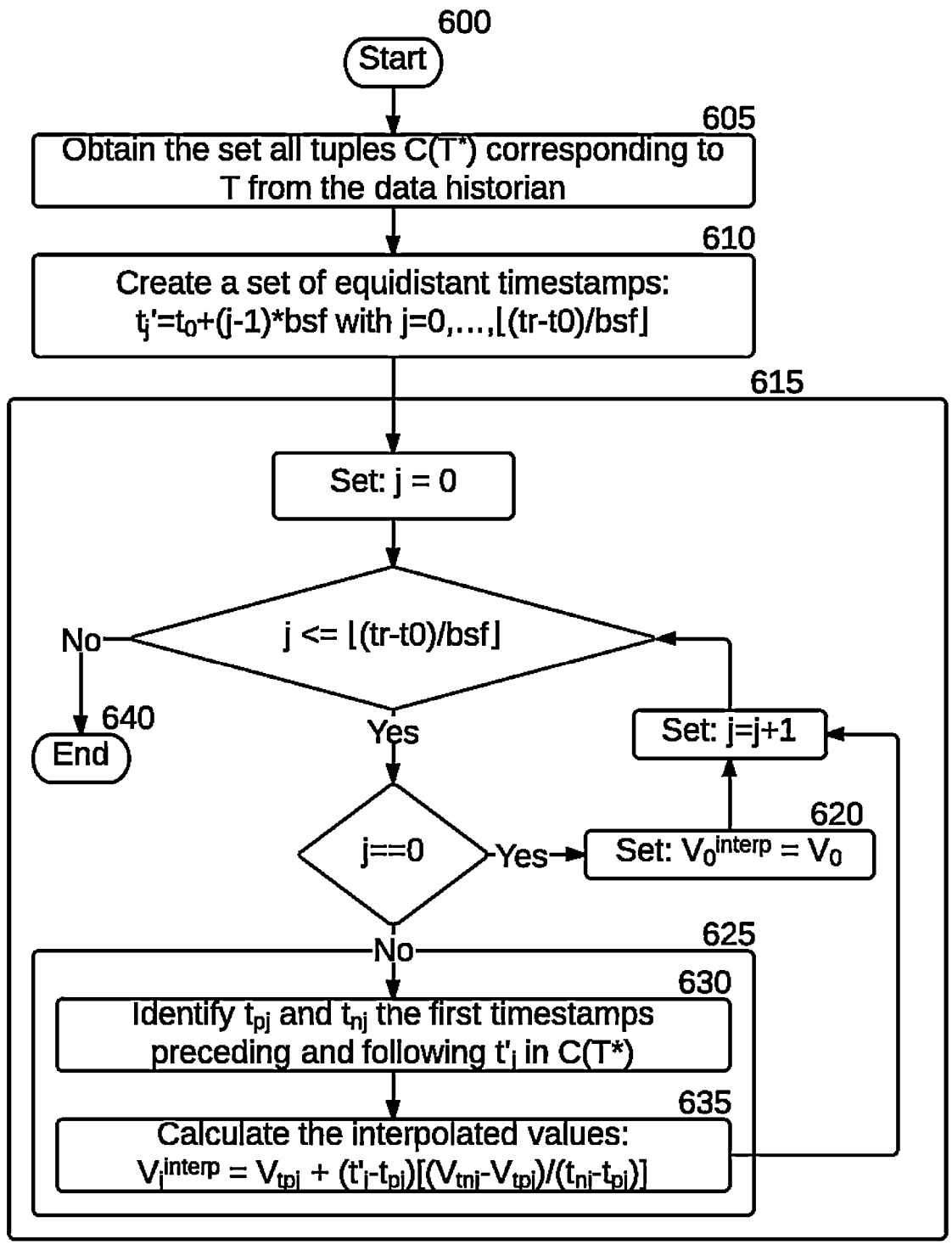
FIG. 6 shows the creation of an expanded process data set from process data originating from a data historian.

FIG. 6 is a flow diagram of a method for constructing the expanded process data set 32 from the process data 30, retrieved from the process data historian 26, having members at regular time intervals. The process data 30 is retrieved from the process data historian 26 in the form of [timestamp, tag, value] tuples. For instance the tuple ["2013-01-01 07:01:55", TI001, 325] represents a measurement of the temperature sensor TI001 recorded at 2013-01-01 07:01:55 with a value of 325 degrees. Subsequent samples of the same tag (in this case temperature sensor TI001) can be stored in the data historian 26 at irregular time intervals. Interpolating the process data 30 creates the expanded process data set 32 with members at regular time intervals, as discussed above.

The method starts in step 600 assuming given a base sample frequency bsf, a specific tag T* with an earliest recorded measurement at time $t_0$ and most recent relevant time $t_r$. In step 605, obtain the set of all tuples [$t_i$,T*,$V_i$] as defined previously corresponding to the specific tag T* from the process data historian 26 and store this as C(T*). In step 610 a set of equidistant time stamps $t_j'$ is created with a fixed time value starting from to and running till $t_r$ as follows: $t_j'=t_0+j*bsf$, j=0, ..., $\lfloor(tr-t0)/bsf\rfloor$. In step 615 an iterative procedure is entered to create a new set of tuples IC(T*)= [$t_j'$,T*,$V_j^{interp}$]. The interpolated values $V_j^{interp}$ in the interpolated data set are created as follows. In step 620 set the first value equal to the first value of the original tuple.

$$V_0^{interp} = V_0$$

In step 625 the interpolation procedure is entered. In step 630 time stamps $t_{p_j}$ and $t_{n_j}$ are identified as the first time stamps in the sampled process data C(T*) preceding and following $t_j'$ respectively. In step 635 the remaining values are calculated as follows:

$$V_j^{interp} = V_{t_{p_j}} + (t_j' - t_{p_j})\left[\frac{V_{t_{n_j}} - V_{t_{p_j}}}{t_{n_j} - t_{p_j}}\right]$$

The method ends in step 640 where the corresponding expanded process data set 32 comprising the time series IC(T*) is created as follows: IC(T*)=[$t_j'$,$V_j^{interp}$]. This is an example of a linear interpolation.

In one further additional aspect of the disclosure, the interpolation starts from the closest rounded time unit (e.g. second, minute, hour or day) which is chosen to be the start time $t_0$ by the user. In one further additional aspect of the disclosure, the interpolation starts from a user defined start time to.

It will be appreciated that other interpolation techniques can be implemented using other schemes. In particular, sample and hold interpolation, higher order interpolation and spline-based interpolation may be considered as alternatives to the described linear interpolation mode.

The interpolated data of a single one of the tags in the expanded data set 32 can be regarded as a univariate time series, and similarly the interpolated data of multiple tags combined can be regarded as a multivariate time series in the expanded data set 32. The data connection device 20 further allows obtaining subsequences of time series (univariate and multivariate) over a given time frame from the data historian 26.

Figure 7:
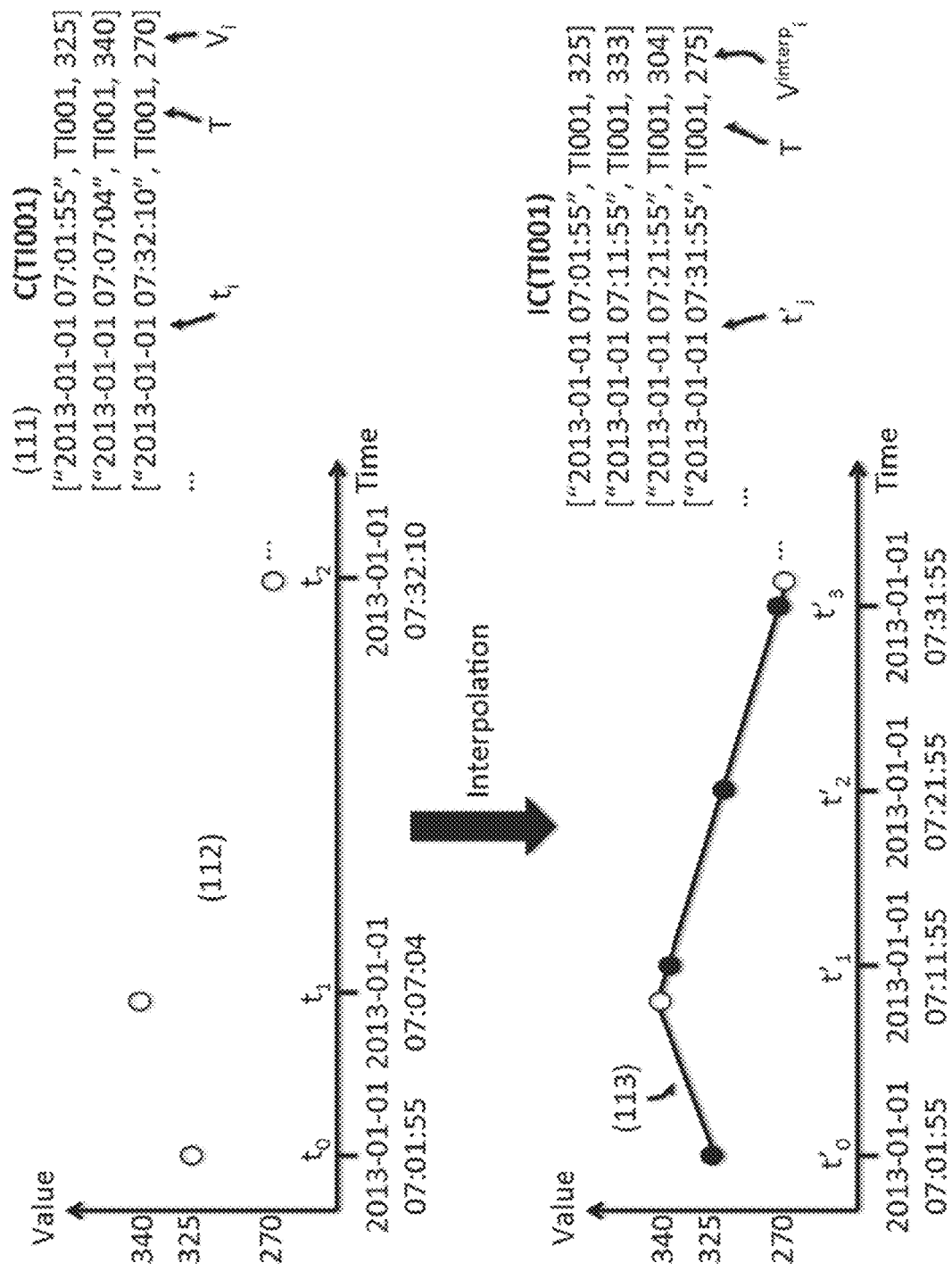
FIG. 7 shows the creation of an expanded process data set from the process data originating from a data historian example.

FIG. 7 shows a simple example of creating an expanded process data set 32 from the process data 30. Given the set C(TI001) of all tuples for the tag TI001 it is possible to represent the set of tuples C(TI001) graphically as points in a scatter plot with the time on the X-axis and the corresponding measured value on the Y-axis. These points are displayed as empty circles in FIG. 7. In order to perform the interpolation, subsequent points in the scatter plot can be connected virtually by a straight line and for a given base sample frequency (bsf) equidistant sample times $t_j'$ can be created. In this example the base sample frequency bsf is 10 minutes. The expanded process data set 32 comprising the equidistantly sampled data IC(TI001) is created by calculating, using the equation above, the value $V_j^{interp}$ on the straight line connecting the original data at the equidistant sample times $t_j'$. This is shown on the bottom half of the figure.

Figure 8:
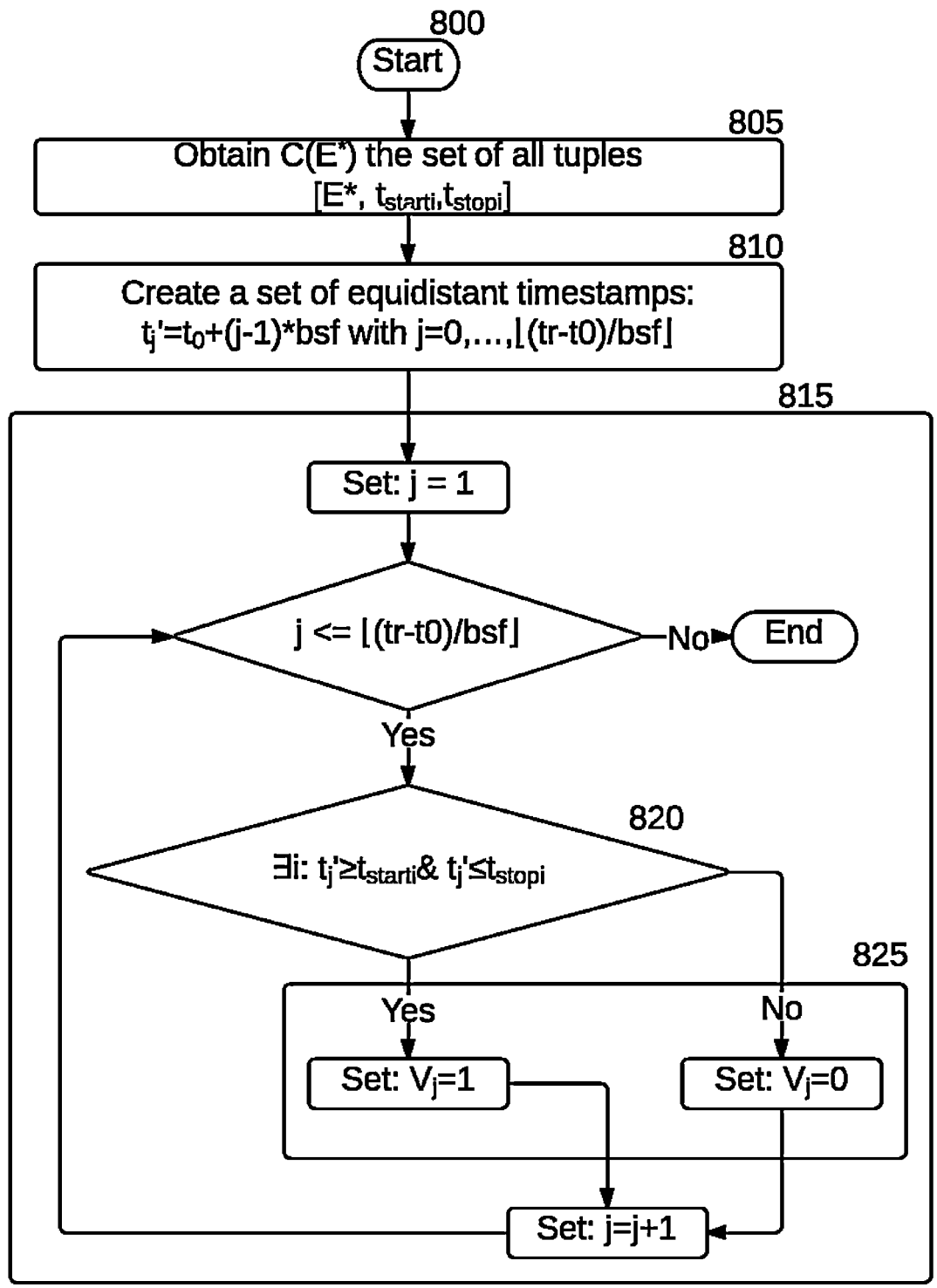
FIG. 8 shows the creation of an expanded process data set from the process data originating from a data logger.

FIG. 8 is a flow diagram of a method for constructing the expanded process data set 32 from the process data 30, retrieved from the data logger 24, having members at regular time intervals. The process data 30 retrieved from the data logger 24 comprises, but is not limited to, alarm logging systems, electronic logbooks, and can be retrieved in the form of a tuple having a form [event identifier, start time, stop time]. One example of the tuple would be ["maintenance Pump200", "2013-01-01 00:00:00", "2013-01-01 00:14:59] representing a maintenance event on Pump200 during the first 15 minutes of January 2013.

The method starts in step 800 assuming given the base sample frequency bsf, a specific event identifier E* with earliest start time $t_0$ and most recent relevant time $t_r$. In step 805, obtain C(E*), the collection of all of the tuples [E*, $t_{start_i},t_{stop_i}$] corresponding to E* from the data logger 24. The value $t_{start_i}$ represents the start time and the value $t_{stop_i}$ represents the stop time. In step 810 a set of equidistant timestamps $t_j'$ is created with a fixed time value starting at $t_0$ and running to $t_r$ as follows: $t_j'=t_0+j*bsf$, j=0, ..., $\lfloor(tr-t0)/bsf\rfloor$. In step 815 an iterative procedure running over all equidistant timestamps is entered to create a new time series subsequence IC(E*) as follows. In step 820 identify whether there exists a time frame [$t_{start_i},t_{stop_i}$] such that $t_j' \in [t_{start_i}, t_{stop_i}]$. In step 825 add a tuple [$t_j'$,$V_j$] to IC(E*) with $$V_j = \begin{cases} 1, & \text{if } \exists\, i, t_j' \geq t_{start_i}, t_j' \leq t_{stop_i} \\ 0, & \text{otherwise} \end{cases}.$$

In one further additional aspect of the disclosure, the creation of equidistant timestamps $t'_j$ starts from the closest rounded unit of time, which can be chosen by the user, e.g. second, minute, hour or day, to $t_0$. In one further additional aspect of the disclosure, the creation of equidistant timestamps $t'_j$ starts from a user defined start time $t_0$.

The transformed data corresponding to the single event identifier can be regarded as a univariate time series, and similarly the transformed data of multiple event identifiers combined as a multivariate time series. The process data connection device 20 further allows obtaining subsequences of time series (univariate and multivariate) over a given time frame from the data logger 24.

Figure 9:
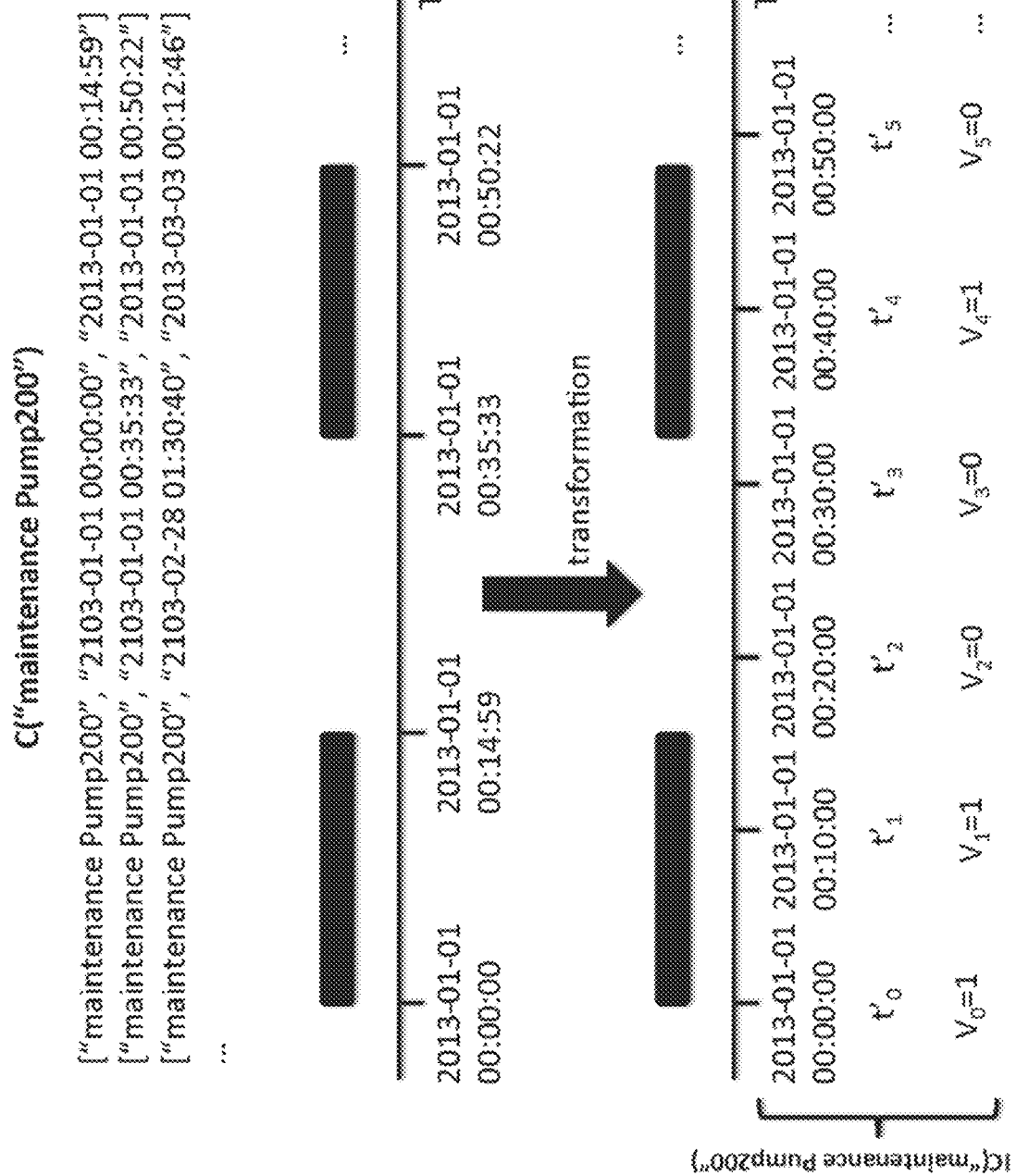
FIG. 9 shows the creation of the expanded process data set from the process data originating from a data logger example.

FIG. 9 shows a simple, non-limiting example of creating an expanded process data set 32 from process data 30 originating from the data logger 24. Given the set C("maintenance Pump200") of all of the tuples for the event identifier EID indicated by "maintenance Pump200" check for each one of the timestamps corresponding to a multitude of the base sample frequency starting from the earliest start time of all tuples in the set C("maintenance Pump200") whether this timestamp lies in between an interval $[t_{start_i}, t_{stop_i}]$ in any of the tuples. The intervals are displayed in FIG. 9 as black bands on a Gantt-like chart. If any time $t'_i$ lies within these bands a value of 1 can be assigned to this timestamp in the corresponding time series, otherwise the value 0 can be assigned. In the example of FIG. 9 the start of the resulting expanded process data set 32 would contain the tuples: ["2013-01-01 00:00:00", 1], ["2013-01-01 00:10:00", 1], ["2013-01-01 00:20:00", 0], etc.

Figure 10:
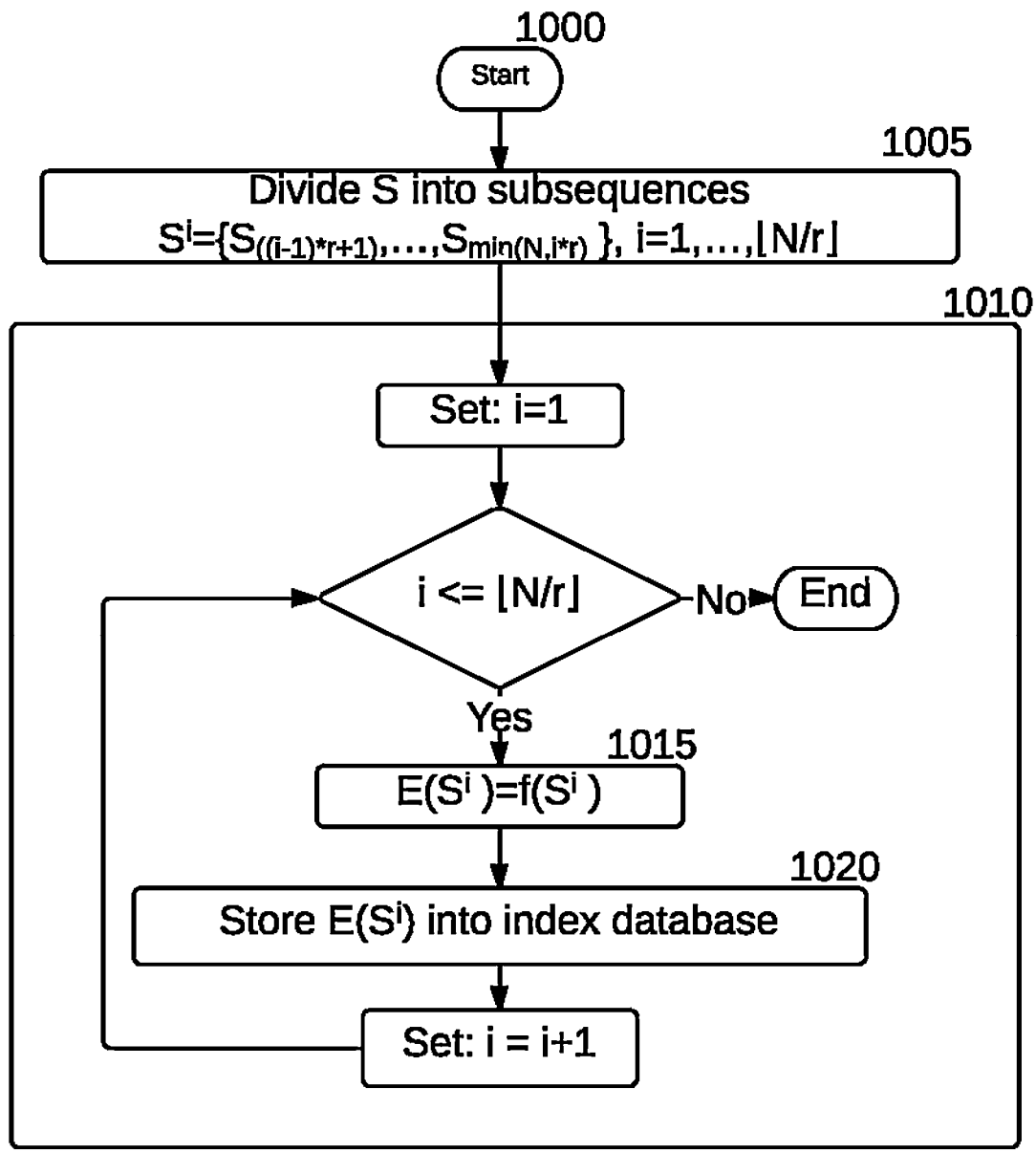
FIG. 10 shows a flow diagram for generation of an index database from expanded process data set using the fixed indexing approach.

FIG. 10 is a flow diagram of a method for generating the index database 35 using the fixed indexing approach from the process data 30 originating from either the data historian 26 or the data logger 24. The method starts in step 1000 assuming given a signal identifier S and the corresponding expanded process data set 32 created as described above consisting of a real-valued equidistantly sampled time series ($S=\{S_{t_1}, \ldots, S_{t_N}\}$ or equivalently $S=\{S_1, \ldots, S_N\}$ to simplify notation), $r \in \mathbb{N}$ a predetermined index resolution, as defined previously and a predetermined indexing system 70 using the indexing function $f: \mathbb{R}^r \to \mathbb{R}^d$ with $d \in \mathbb{N}$ and $d \ll r$. In step 1005 the time series is divided in subsequences $S^i$ for given time slices $[(i-1)*r+1, i*r]$, $i=1, \ldots, \lfloor N/r \rfloor$:

$$S^i = \{S_{(i-1)*r+1}, \ldots, S_{\min(N, i*r)}\}.$$

In other words, for a signal identifier S, all equidistant samples starting from $t_0$ are split into non overlapping consecutive parts each one containing r consecutively recorded measurements of the signal. In step 1010 an iterative procedure is entered running over all subsequences. In step 1015 the indexing function $f$ is applied to the subsequence $S^i$ in order to parameterize $S^i$ to create an index element ($S^i$).

$$E(S^i) = f(S^i) = f(S_{(i-1)*r+1}, \ldots, S_{i*r})$$

In step 1020 the index element, by using the secondary data connection 20, is stored in the index database 35.

To create the full index database 35 this process is repeated for all of the time series corresponding to all signal identifiers. Without loss of generality it can be assumed that the index database 35 is ordered based on the first time stamp of each $S^i$. Hence the v-th element of the index database refers to $E(S^v)$.

Figure 22:
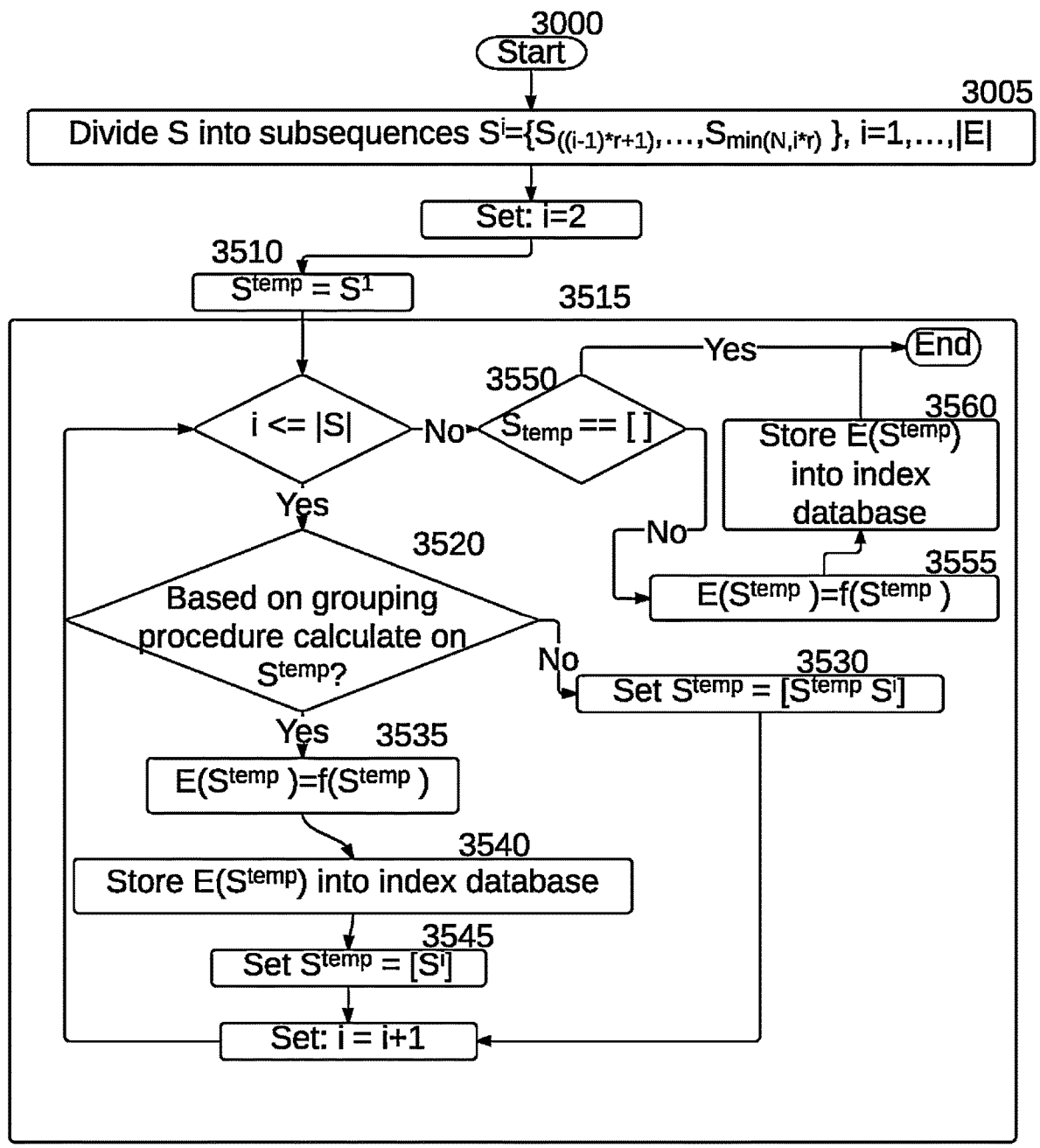
FIG. 22 shows a flow diagram for generation of an index database from expanded process data set using the variable indexing approach.

FIG. 22 is a flow diagram of a method for generating the index database 35 using the variable indexing approach from the process data 30 originating from either the data historian 26 or the data logger 24. The method starts in step 3000 assuming given a signal identifier S and the corresponding expanded process data set 32 created as described above consisting of a real-valued equidistantly sampled time series ($S=\{S_{t_1}, \ldots, S_{t_N}\}$ or equivalently $S=\{S_1, \ldots, S_N\}$ to simplify notation), $r \in \mathbb{N}$ a predetermined index resolution, as defined previously and a predetermined indexing system 70 using the indexing function $f: \mathbb{R}^r \to \mathbb{R}^d$ with $d \in \mathbb{N}$ and $d \ll r$. In step 3005 the time series is divided in subsequences $S^i$ for given time slices $[(i-1)*r+1, i*r]$, $i=1, \ldots, \lfloor N/r \rfloor$:

$$S^i = \{S_{(i-1)*r+1}, \ldots, S_{\min(N, i*r)}\}.$$

In other words, for a signal identifier S, all equidistant samples starting from $t_0$ are split into non overlapping consecutive parts each one containing r consecutively recorded measurements of the signal. In step 3510 a set $S^{temp}$ is initialized to contain the first subsequence $S^1$. $S^{temp}$ will hold the concatenation of the set of subsequences that have not been indexed up until this iteration. In step 3515 an iterative procedure is entered running over all remaining subsequences ($S^2, \ldots, S^{\lfloor N/r \rfloor}$). In step 3520 based on a grouping procedure, as explained later, it is decided whether to grow $S^{temp}$ or create an index element for $S^{temp}$. In step 3530 the last unhandled subsequence $S^i$ is concatenated to $S^{temp}$. In step 3535 the indexing function $f$ is applied to the subsequence $S^{temp}$ in order to parameterize $S^{temp}$ to create an index element ($S^{temp}$).

$$E(S^{temp}) = f(S^{temp}) = f(S_a, \ldots, S_b)$$

where a ($=t_a$) is the time of the start of the first subsequence in $S^{temp}$ and b ($=t_b$) the time of the end of the last subsequence in $S^{temp}$. In step 3540 the index element, by using the secondary data connection 20, is stored in the index database 35. In step 3545 the $S^{temp}$ is set to hold the last unhandled subsequence $S^i$. In step 3550 a check is performed to assert whether $S^{temp}$ is empty.

In step 3555 the indexing function $f$ is applied to the subsequence $S^{temp}$ in order to parameterize $S^{temp}$ to create an index element ($S^{temp}$). In step 3560 the index element, by using the secondary data connection 20, is stored in the index database 35.

To create the full index database 35 this process is repeated for all of the time series corresponding to all signal identifiers. Without loss of generality it can be assumed that the index database 35 is ordered based on the first time stamp of each $S^i$. Hence the imf(v)'th element of the index database refers to $E(S_{imf(v)})$.

FIG. 24 is a non-limiting example of a particular implementation of the grouping procedure in this invention. The grouping procedure starts assuming given the set e of index elements $E(S^i)$, $i=1, \ldots, \lfloor N/r \rfloor$, resulting from the fixed indexing approach. A hierarchical clustering approach, such as those described in "Hierarchical Clustering Schemes, Johnson, Stephen C., Psychometrika, 1967, p. 241-254", with a strict restriction on reordering the elements, is used to cluster the index elements based on distances between the index elements. A level parameter h is chosen as the cut point of the hierarchical clustering tree, thereby generating clusters for that level.

The indexing function is applied to a set $S^{temp}$ when it matches the subsequences present in one of the remaining clusters for the chosen level. The remaining clusters for the above example are indicated by the thick containers around the $E(S^i)$ in FIG. 24, namely ([$E(S^1), E(S^2), E(S^3)$], $S^4$, [$E(S^5), E(S^6)$], ..., $E(S^{\lfloor N/r \rfloor})$). The corresponding $S^{temp}$ subsequences that will be indexed are: ([S1 S2 S3], S4, [S5 S6], ..., $S^{\lfloor N/r \rfloor}$).

In an possible extension of the current invention the elements corresponding to a given signal identifier S are created and stored in the index database 35 only when they are selected in a search instruction 60 for the first time. Subsequent search instructions including the same given signal S identifier do not require building the corresponding elements since the elements will have already been created.

In another possible extension of the current invention, the index database 35 is updated at regular time intervals by applying the proposed method for all data recorded in the data historian 26 and data logger 24 during this time interval. For instance, the index database is expanded weekly by parameterizing all data recorded the previous week. This would allow a batch process to be performed when computer resources are under-utilised, such as at weekends.

In one implementation of the fixed indexing approach, the indexing function $f$ can be defined as:

$$f: \mathbb{R}^r \to \mathbb{N} * \mathbb{R}^2$$

$$(x_1, \ldots, x_r) \mapsto (1, \min(x_1, \ldots, x_r), \max(x_1, \ldots, x_r))$$

and thus:

$$E(S^i) = (1, \min(S_{(i-1)^*r+1}, \ldots, S_{\min(N,i)^*r}), \max(S_{(i-1)^*r+1}, \ldots, S_{\min(N,i)^*r}))$$

In one implementation of the variable indexing approach, the indexing function $f$ can be defined as:

$$f: \mathbb{R}^n \to \mathbb{N} * \mathbb{R}^2$$

$$(x_1, \ldots, x_n) \mapsto \left(\frac{n}{r}, \min(x_1, \ldots, x_n), \max(x_1, \ldots, x_n)\right)$$

The indexing function for the fixed indexing approach in this case is a special case of the indexing function for the variable indexing approach where n=r in all cases.

Figure 11:
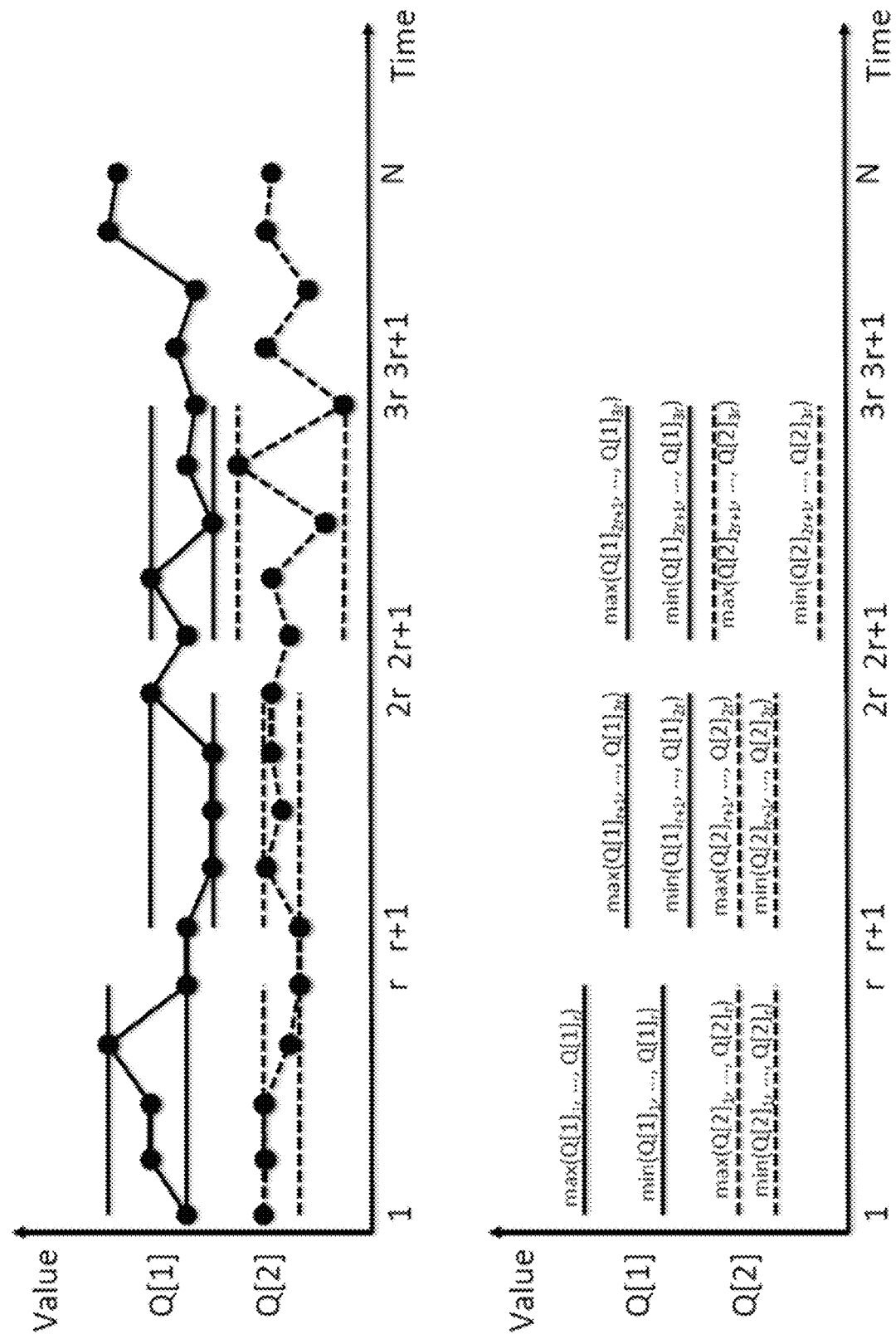
FIG. 11 shows an example of the generation of the index database from expanded process data set example using the fixed indexing approach.

FIG. 11 is a simple non-limiting example for generating the elements in the index database 35 using the fixed indexing approach from the process data 30. The indexation works on the basis of dividing the process data 30 into non-overlapping time-slices {[1,r]. [r+1,2r], . . . }. The time and these time slices are depicted graphically in FIG. 11 on the X-axis. The Y-axis depicts the values for these measurements. In the example, the expanded process data from two of the signals identified by Q[1] and Q[2] are shown. Given the exemplary indexing function as described previously per time slice the maximum and minimum value per time slice are calculated. These maximum and minimum values are shown graphically in the bottom half of the figure per time slice by means of the vertical full and dashed lines for Q[1] and Q[2] respectively. An element E(Q[i]J) is calculated per time slice [(j−1)*r+1,j*r] for each tag Q[i].

Figure 23:
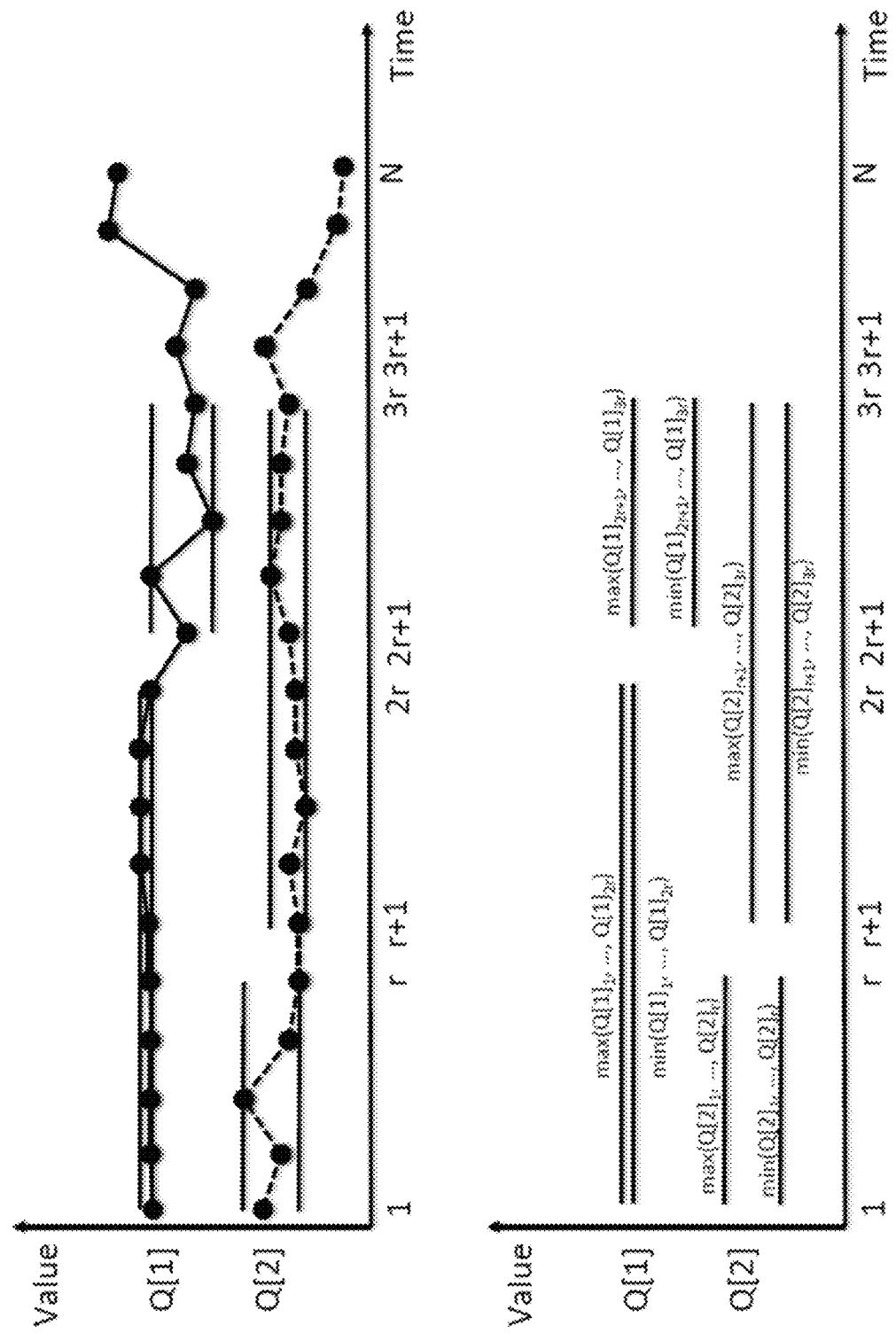
FIG. 23 shows an example of the generation of the index database from expanded process data set example using the variable indexing approach.

FIG. 23 is a simple non-limiting example for generating the elements in the index database 35 using the variable indexing approach from the process data 30. The indexation works on the basis of dividing the process data 30 into non-overlapping time-slices of variable size (which are integer multiples of the resolution r). The time and these time slices are depicted graphically in FIG. 23 on the X-axis. The Y-axis depicts the values for these measurements. In the example, the expanded process data 32 from two of the signals identified by Q[1] and Q[2] are shown. Given the exemplary indexing function as described previously per time slice the maximum and minimum value per time slice are calculated. These maximum and minimum values are shown graphically in the figure per time slice by means of the vertical full and dashed lines for Q[1] and Q[2] respectively. An element $E(Q[i]^j)$ is calculated per time slice for each tag Q[i]. The difference with the indexing in FIG. 11 is that now potentially longer time-slices are indexed. This saves computer storage space.

Figure 12:
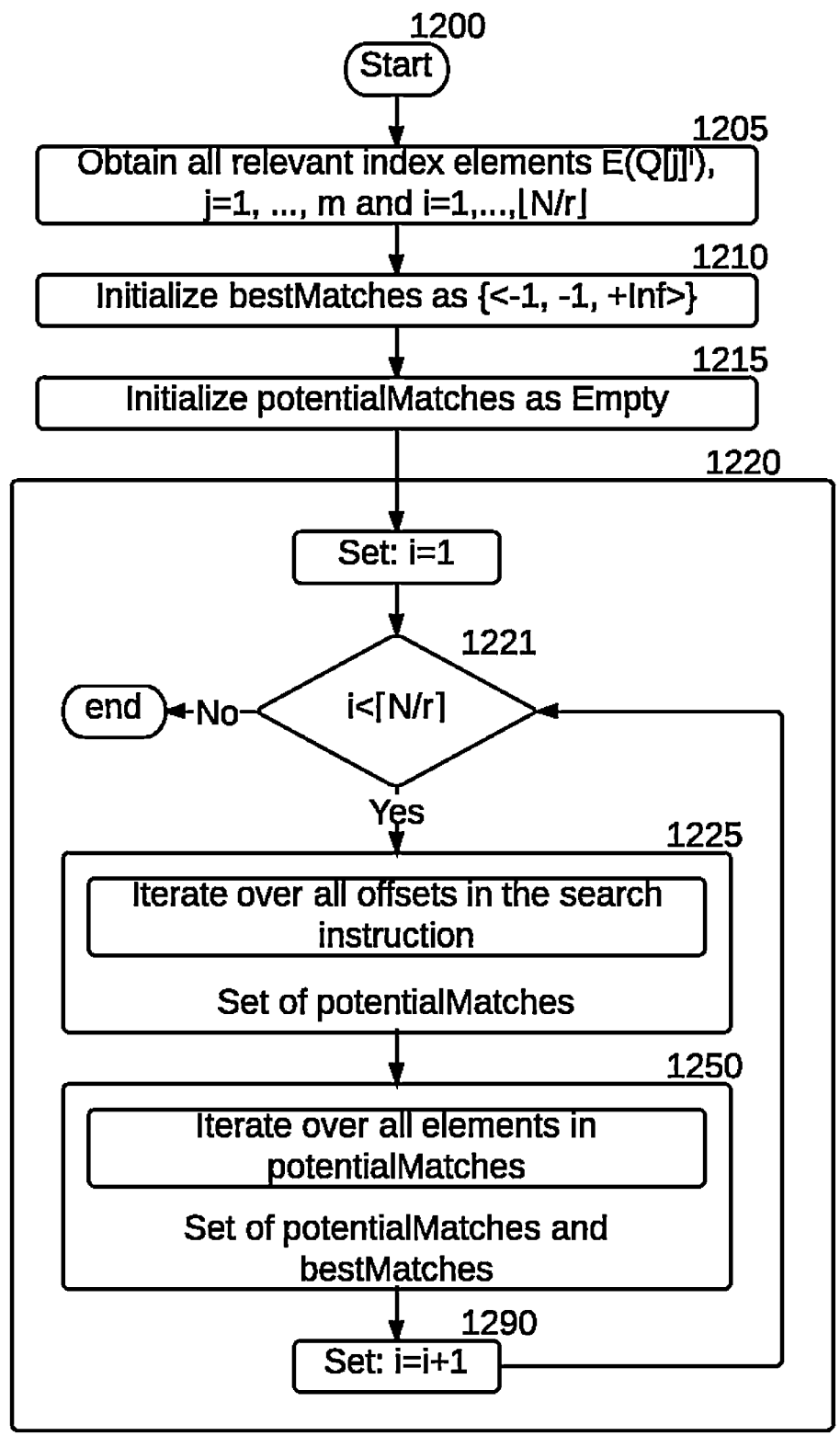
FIG. 12 shows a flow diagram of one implementation of the search method with early stopping.

FIG. 12 depicts the flow diagram of one implementation of the method with an added option for terminating the comparison based on cumulative distances (i.e. similarity values). In other words, the comparison is terminated when the similarity is such that there is no need to continue with the comparison. The termination saves computer processing time.

The implementation starts in step 1200 with the data processing device 80 receiving:

A search parameter set 901 of a search instruction 60 Q consisting of time series subsequences Q[1]={Q[1]$_k$, . . . , Q[1]$_{k+l-1}$}, . . . , Q[m]={Q[m]$_k$, . . . , Q[m]$_{k+l-1}$};

A predetermined number b representing the number of best results to return;

A predetermined threshold E representing the maximum distance between elements in the index database (35) and the search parameter set (90);

A distance function $\psi: \mathbb{R}^{d*} \mathbb{R}^d \to \mathbb{R}$;

The method for comparing operates as follows. In step 1205 the relevant index elements are acquired from the index database 35.

In step 1210 the result set bestMatches is initialized as follows:

bestMatches={<−1,−1,+∞>}

In step 1215 initialize a set of potential matches as follows:

potentialMatches=∅ (i.e. the set has no values at the beginning)

Each element in bestMatches and potentialMatches is a tuple <offset,indexId,cumDistance> in which offset∈{0,r−1} representing the first point in the search instruction 60 that is matched with elements in the index database 35, indexId is a unique identifier for the indexId'th element in the index database 35 as if using the fixed indexing approach and cumDistance is the cumulative distance at each point in the comparison step. Without loss of generality we can assume that there are $$\left\lfloor \frac{N}{r} \right\rfloor$$

elements in the indexed process data 35 when using the fixed indexing approach.

In step 1220 an iterative procedure running over the total number elements in the indexed process data 35 when using the fixed indexing approach is entered. In step 1225, described in more detail below, an iterative procedure is entered running over all of the offsets in the search instruction 60. Step 1225 ends with the creation of a set of potentialMatches. This set of potentialMatches holds intermediate results relevant up until the current element in the index database 35. In step 1250, described in more detail below, an iterative procedure is entered running over all elements in the set potentialMatches. Step 1250 ends with an updated set of potentialMatches and an updated set of bestMatches if applicable. At the end of step 1220 the set bestMatches contains the tuples corresponding to the results to be returned to the output device 100.

Figure 19:
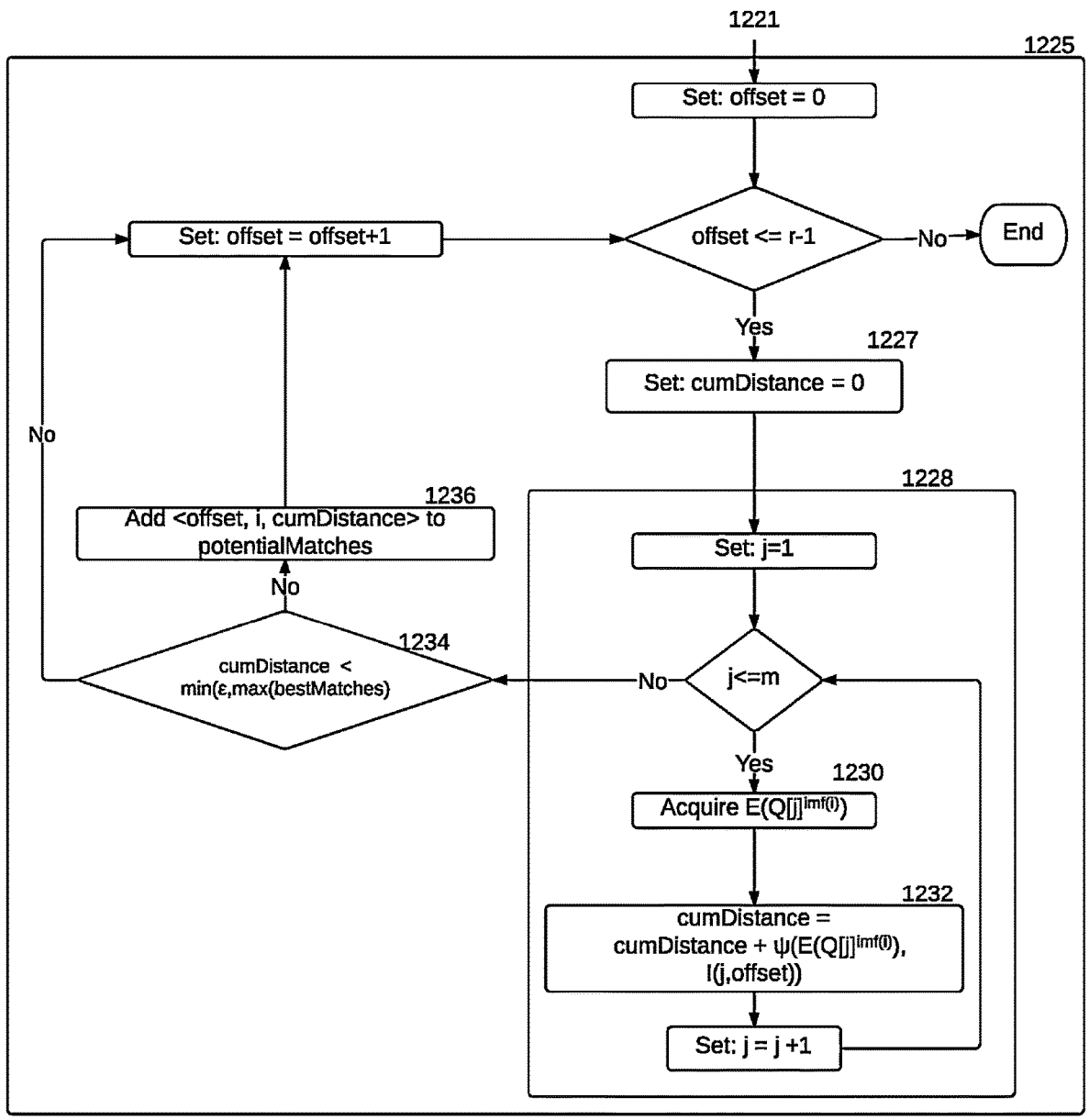
FIG. 19 Sub-procedure of one implementation of the search method with early stopping.

FIG. 19 depicts the iterative procedure running over all offsets [0,r−1] within the search instruction 60 of step 1225 in detail. In step 1227 the value cumDistance is initialized at 0. In step 1228 an iterative procedure is entered running over all signal identifiers in the search instruction 60. In step 1230 the relevant index elements are acquired from the index database 35. In step 1232 the distance between the element I(j,offset) in the search parameter set 90 corresponding to the current offset and the selected element from the index database 35 is calculated and added to the value of cumDistance. In step 1234 a check is performed to verify whether the current value of cumDistance is lower than the user defined maximum dissimilarity and the current largest distance in the set of bestMatches. In step 1236 the tuple corresponding to the current offset and index element is added to the set potentialMatches. Step 1225 ends with an updated set of potentialMatches, which is passed to step 1250.

Figure 20:
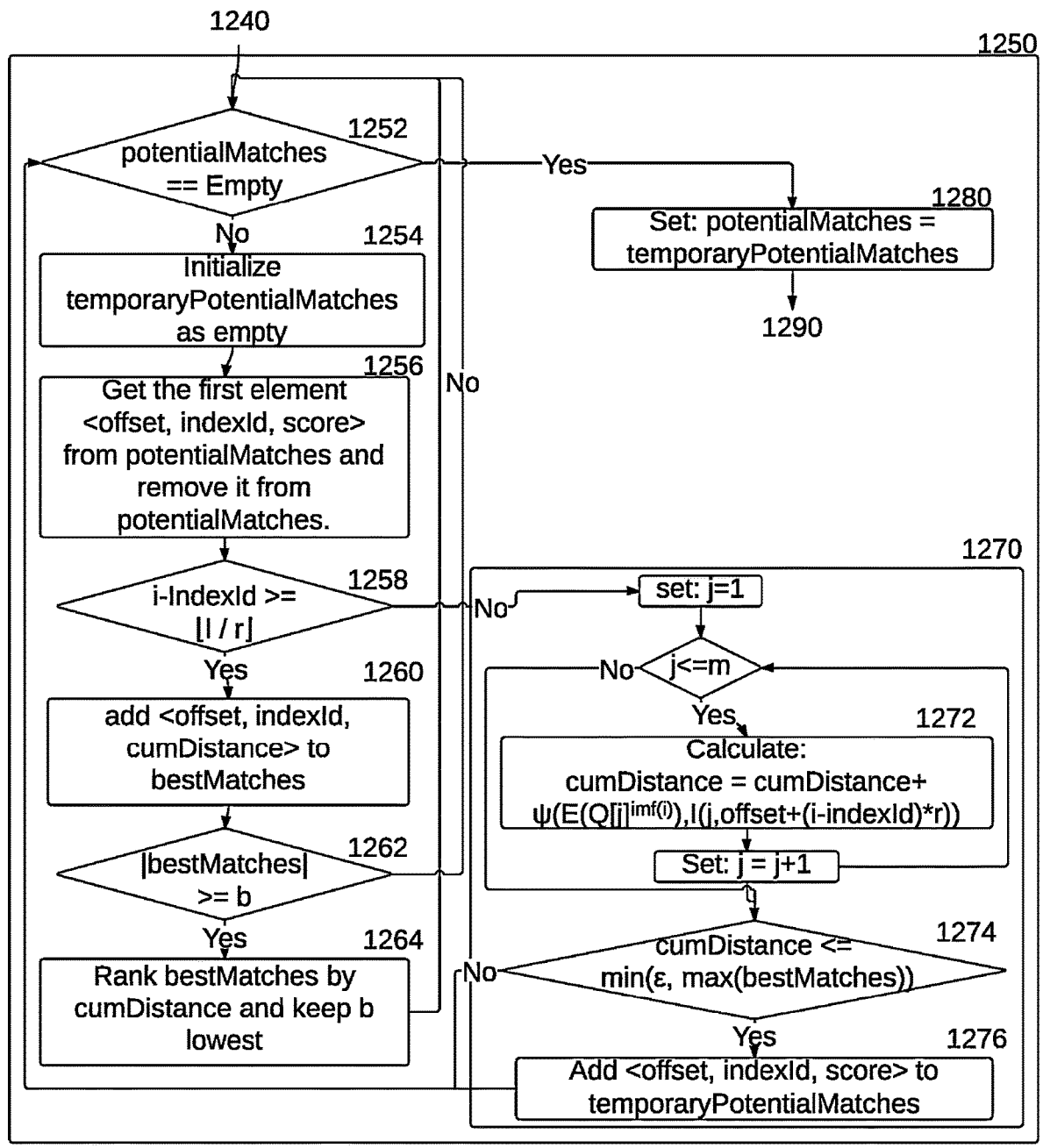
FIG. 20 Sub-procedure of one implementation of the search method with early stopping.

FIG. 20 depicts the iterative procedure running over all elements in the set of potentialMatches of step 1250 in detail. In step 1252 a check is performed to see whether the set of potentialMatches is empty. In step 1254 the set temporaryPotentialMatches is initialized as empty. In step 1256 the first element <offset,indexId,cumDistance> is identified and then removed from the set potentialMatches. In step 1258 a check is performed to see whether the current index element i is further than $\lfloor l/r \rfloor$ elements removed from the current element indexId. In step 1260 the tuple <offset, indexId,cumDistance> is added to the set of bestMatches. In step 1262 a check is performed to see whether the set of bestMatches contains less than the user defined number of allowed results b. If there are more than b members in the set of bestMatches in step 1264 the members are ranked based on the value cumDistance and only the b lowest are retained. In step 1270 an iterative procedure is entered running over all time series subsequences in the search parameter set 90. In step 1272 the distance between the current element in the index database and the search parameter set of the current subsequence corresponding to the current relevant offset is added to the value of cumDistance. In step 1274 a check is performed to see whether the current value of cumDistance is smaller than the user defined maximum allowed distance and the current largest distance in bestMatches. If the current value of cumDistance is smaller it is added to temporaryPotentialMatches in step 1276. In step 1280 the current set of potentialMatches is replaced by the set temporaryPotentialMatches.

The method for comparison as explained above can be described algorithmically as follows:

For i=1, . . . , [N/r], perform the following:
1. For offset=0, . . . , r−1, perform the following:

a.  cumDistance = 0
    b.  For j = 1, . . ., m, perform the following:
       i.  Obtain $E(Q[j]^{imf(i)})$, by the secondary data connection device
       ii.  cumDistance = $\psi(E(Q[j]^{imf(i)}), I(j, \text{offset}))$
    c.  Add    < offset, i, cumDistance > to potentialMatches if cumDistance < $\min(\varepsilon, \max_{\text{score}} \text{bestMatches})$ 2. For each element <offset,indexId,cumDistance> in the set of potentialMatches, perform the following:

a.  Remove the element from the set of potentialMatches
b.  If i − indexId >= $\lfloor l/r \rfloor$:

i.  add the element to the set of bestMatches.
    ii.  if the set of bestMatches contains more than b elements, rank the element by cumDistance and keep only those elements with the b lowest cumDistance.
    iii.  skip to next iteration of (1e)
c.  For j = 1, . . ., m, perform the following:
    i.  cumDistance += $\psi(E(Q[j]^{imf(i)}), I(\text{offset} + (i - \text{indexId}) * r))$ ii.  if istance > $\min_{\text{score}}(\varepsilon, \max \text{bestMatches})$, skip to next iteration (1e).
d.  Add the element <offset, i, cumDistance > to the set of potentialMatches At the end of this procedure, the set of bestMatches contains b tuples representing the closest matches (defined as smallest cumDistance) to the search instruction 60 Q. The set of bestMatches and the set of potentialMatches are stored in memory.

Figure 13:
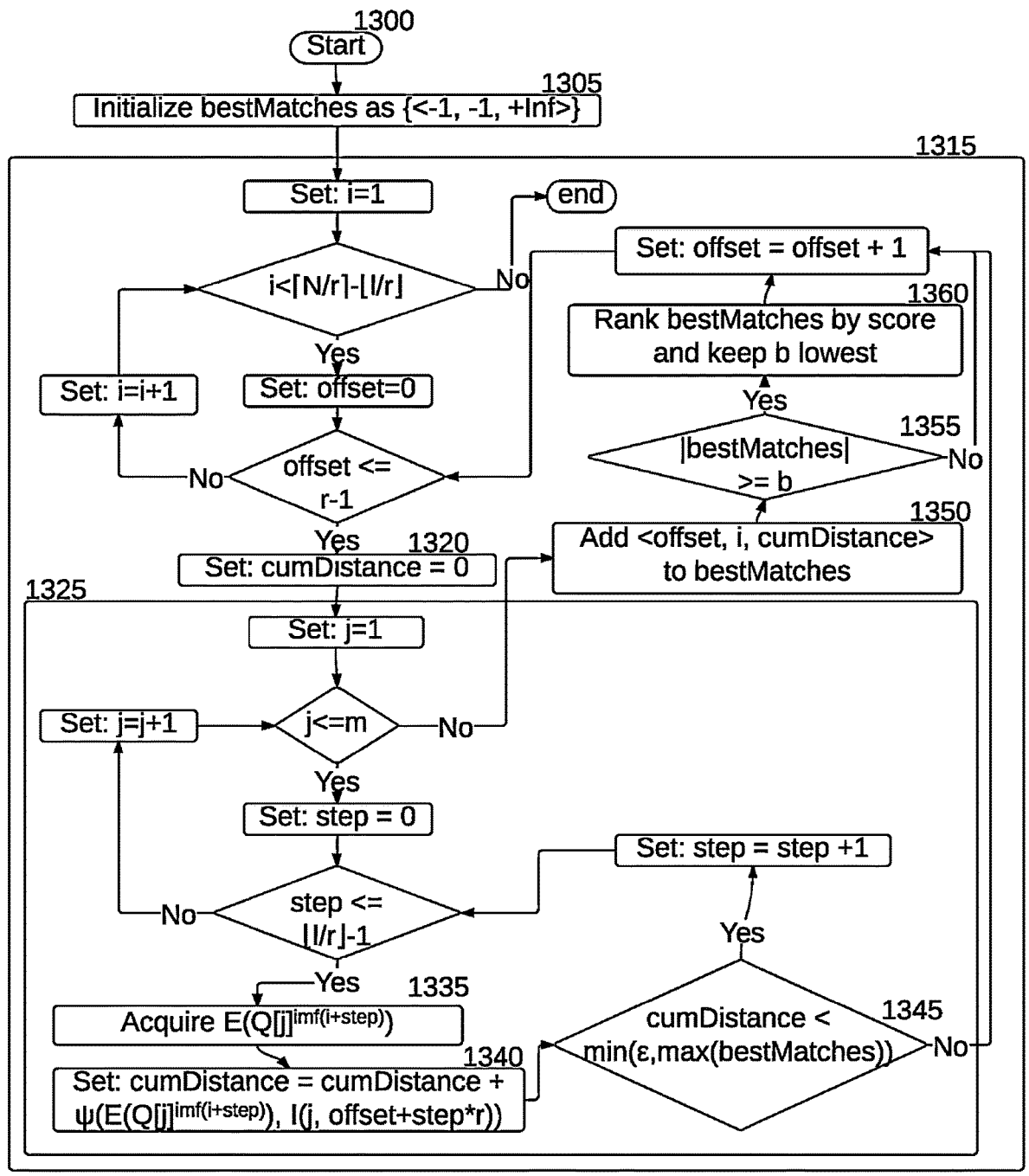
FIG. 13 shows a flow diagram of alternative implementation of the search method with early stopping.

FIG. 13 depicts the flow diagram for an alternative implementation of the method with an added option for terminating the comparison based on cumulative distances (similarity values).

The implementation starts in step 1300 with the data processing device 80 receiving:

A search parameter set 901 of a search instruction 60 Q consisting of time series subsequences Q[1]={Q[1]$_k$, . . . , Q[1]$_{k+l-1}$}, . . . , Q[m]={Q[m]$_k$, . . . , Q[m]$_{k+l-1}$};
    A predetermined number b representing the number of best results to return;
    A predetermined threshold E representing the maximum distance between elements in the index database (35) and the search parameter set (90);
    A distance function $\psi: \mathbb{R}^d * \mathbb{R}^d \to \mathbb{R}$;

the method for comparing operates as follows.

In step 1305 initialize a set of best matches as follows:

bestMatches={<−1,−1,+∞>}

Each element in bestMatch is a tuple <offset,indexId,cumDistance> in which offset∈{0,r−1}, indexId is a unique identifier for an element in the index as if using the fixed indexing approach and cumDistance is the cumulative distance at each point in the comparison step. Without loss of generality the same assumptions and notations are used as above.

In step 1315 an iterative procedure running over the total number elements for each signal identifier in the index database 35 as if using a fixed indexing approach and running over all offsets in the search instruction 60 is entered. In step 1320 the value cumDistance is initialized at 0. In step 1325 an iterative procedure running over all signal identifiers in the search instruction 60 and over all non-overlapping time slices of length r in the search instruction 60 starting with the current offset is entered. In step 1335 the relevant index elements are acquired from the index database 35. In step 1340 the distance between the element I(j,offset+step*r) in the search parameter set 60 and the selected element from the index database 35 is calculated and added to cumDistance. In step 1345 a check is performed to verify whether the current cumDistance is lower than the user defined maximum dissimilarity and the current largest distance in the set bestMatches. In step 1350 the tuple <offset, i, cumDistance> is added to the set of bestMatches. In step 1355 a check is performed to see whether the set of bestMatches contains less than the user defined number of allowed results b. If there are more than b members in bestMatches in step 1360 they are ranked based on cumDistance and only the b lowest are retained.

The method for comparison as explained above can be described algorithmically as follows:

For i=1, ..., ⌊N/r⌋−⌊l/r⌋, perform the following:
1. For offset=0, ..., r−1, perform the following:

a. cumDistance = 0
b. For j = 1, ..., m, perform the following:
   i. step = 0
   ii. while step <= ⌊l/r⌋ − 1, perform the following:
     1. Obtain $E(Q[j]^{imf(i+step)})$, by the data connection device
     2. cumDistance = cumDistance + $\psi(E(Q[j]^{imf(i+step)}), I(j, \text{offset} + \text{step} * r))$
     3. if cumDistance >= min(ε, max bestMatches), skip to next iteration of (1)
                              score
     4. step = step + 1
c. Add <offset, i, cumDistance> to bestMatches
d. If the set bestMatches contains more than b elements, rank the elements in the set bestMatches by the value of the cumDistance and keep only those elements with the b lowest cumDistance in the set bestMatches.

Query Definition

Figure 14:
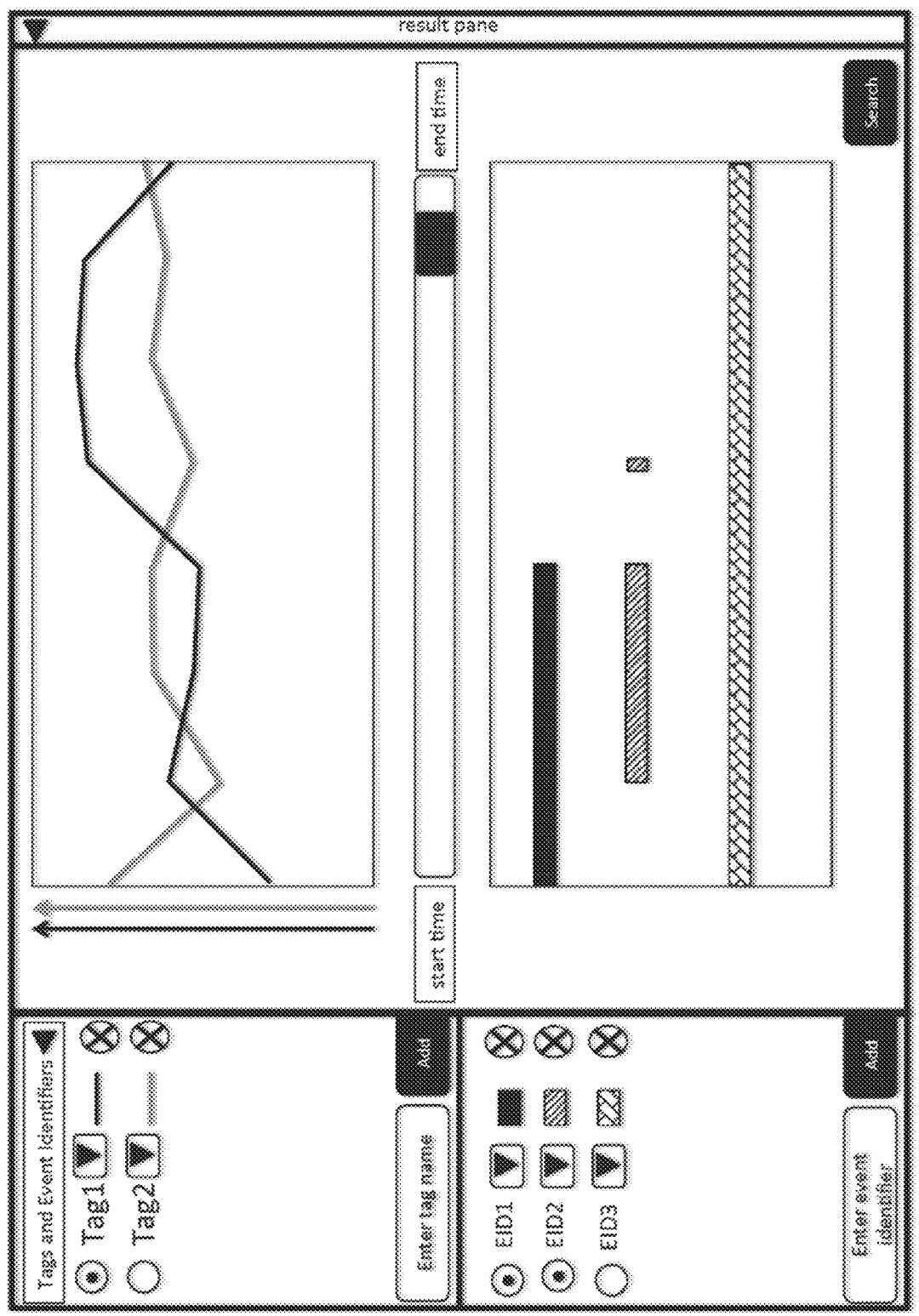
FIG. 14 shows an exemplary display for generating search instruction set.

FIG. 14 shows an exemplary display for the construction of a search instruction 60 according to one aspect of the invention. The operator can select a number of tags (identifiers for data from the data historian 26), event identifiers (identifiers for data from the data logger 24) and a time frame. The time frame can be selected by means of, for instance, inputting a start and end date in the corresponding fields or dragging the scroll bar on the display device 101. The tags can be added by means of, for instance, typing the tag name in the corresponding field and clicking the Add button. The event identifiers can similarly be added by, typing the name in the corresponding field and clicking the Add button. Clicking the Add button for the tag name draws the measurements of that tag for the selected time frame in the trend viewer. Clicking the Add button for the event identifiers draws Gantt-like bars for the combination of start stop times within the selected time frame. The search instruction 60 is visually completely defined by the current view of the display. The time series subsequences specified by the user's selection are acquired by means of the process data connection device 20 and displayed either in a trend viewer or in a Gantt-like chart representation in the output device 100. The user can start the search by clicking the corresponding button displayed on the display.

Given the set ST* of selected tags, the set SE* of selected event identifiers and the time frame $[t_k, t_{k+l-1}]$ in the display, the search instruction 60 Q is defined as follows. Q is a (multivariate) time series subsequence consisting of time series subsequences $Q[1]=\{Q[1]_k, \ldots, Q[1]_{k+l-1}\}, \ldots, Q[m]=\{Q[m]_k, \ldots, Q[m]_{k+l-1}\}$ with, 1, ..., m, representing the signal identifiers, where Q[1], ..., Q[m] are the subsequences of the expanded process data 32 of 1, ..., m over the selected time frame.

When the user clicks the search button, the search instruction 60 Q is transformed into a search parameter set 90 I as explained previously. Next, the comparison method is applied as explained previously.

Adding/Resetting Weights

Figure 17:
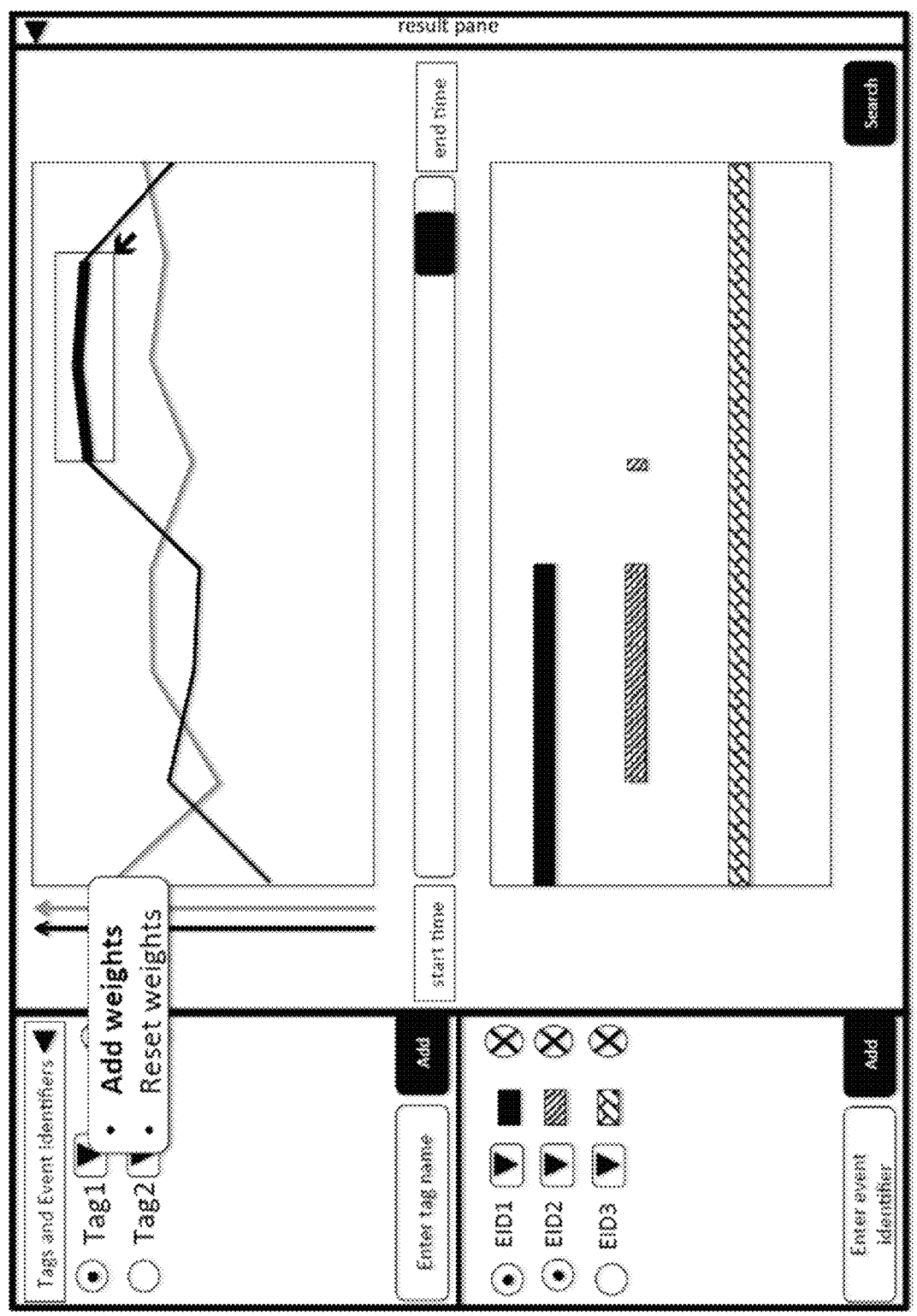
FIG. 17 shows an exemplary display for adding weights to a search instruction set.

By default each one of the tags Q[i] in the search instruction 60 (time series subsequence $Q[i]=\{Q[i]_k, \ldots, Q[i]_{k+l-1}\}$) has a corresponding weight vector $W[i]=\{W[i]_k, \ldots, W[i]_{k+l-1}\}=\{1, \ldots, 1\}$ associated with the tags Q[i]. As shown in FIG. 17, the user can further specify the search instruction 60 Q by assigning weights to each individual measurement of the selected ones of the tags. Clicking the downward triangle next to the tag name and selecting "Add Weights" and then brushing the area on the trend viewer does this. Each pass with a left button downed mouse over a time frame in the trend viewer augments the weights W of the measurements of the selected tag by doubling the current weight. The weights can be reset by selecting the button "Reset weights".

Result Step

Figure 15:
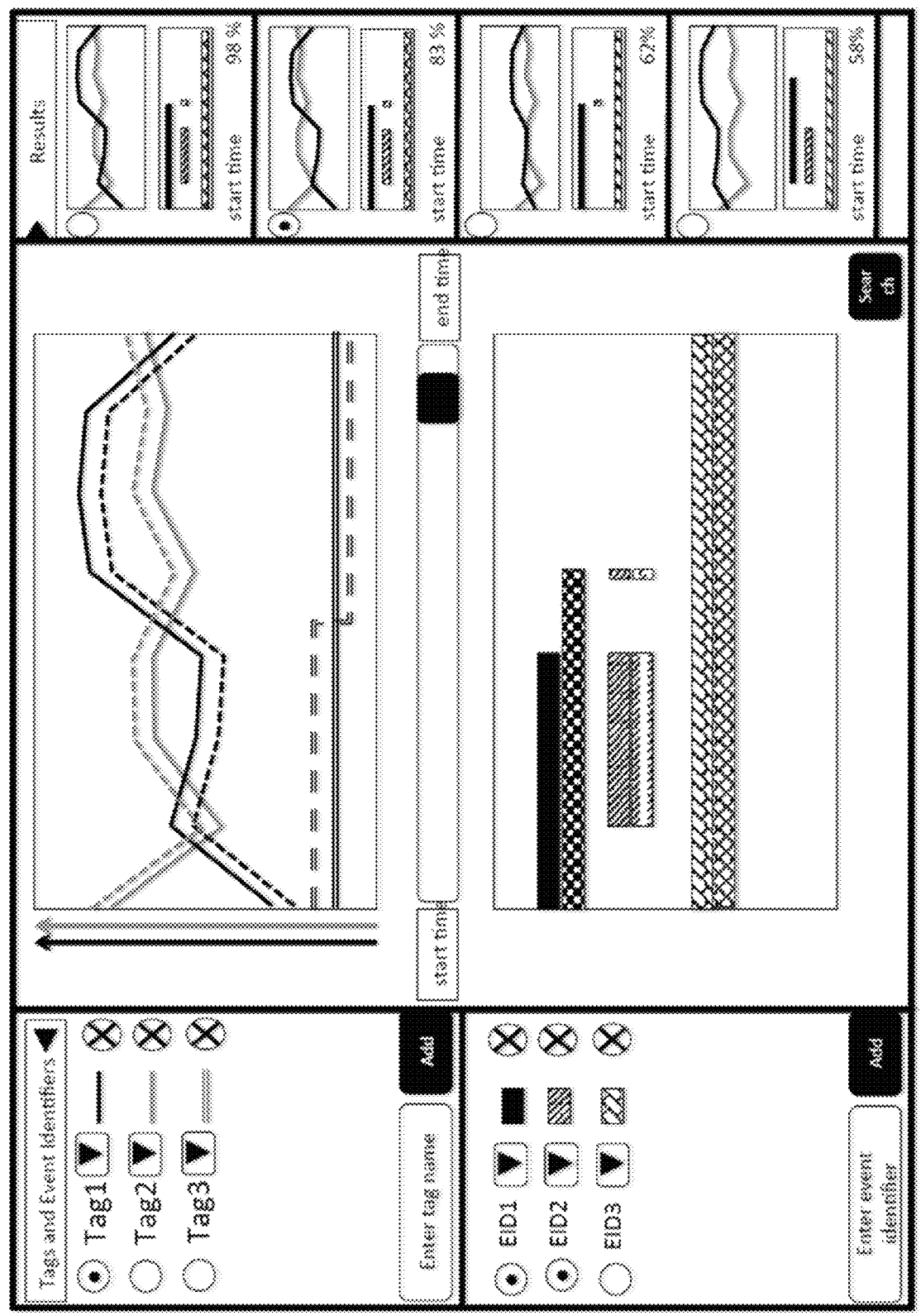
FIG. 15 shows an exemplary display for results.

FIG. 15 depicts an exemplary display for the results of the method. The time series corresponding to the set bestMatches are acquired by means of the process data connection device 20 from the process data sources 40 and displayed as icons in the result pane of the display on the console in a similar manner as for the search instruction 60 selection together with their start time and the cumulative distance. The user can select any of the results displayed by selecting the displayed result with any of the available input modi, such as, but not limited to, a cursor, a pointer, a finger on a touch screen. When selected, the match is plotted on the main pane by means of dashed trends in the trend viewer and dashed Gantt-like bars within the Gantt-like chart.

On the display of the console it is possible to add extra ones of the tags and/or event identifiers in the same manner as for the construction of the search instruction 60. These additional tags and/or event identifiers will add the corresponding time series subsequences from both the query time frame in solid lines and the match time frame in dashed lines to the plot.

EXAMPLES

Example 1

Waste Incineration

An example of typical usage of this invention is given. An operator in a waste incinerator plant is following the live trend of the carbon monoxide level (indicated by the tag CO) and the temperature in the oven (indicated by the tag T). This means that the view in the display 51 of the input system 50 comprises, for instance, a live feed of the last hour of measurements from tags CO and T. In this scenario, the Gantt like representation on the bottom of the display is empty. At a certain moment the CO-level begins to climb and peaks over the allowed threshold while the temperature in the oven decreases. The current practice forces the operator to either work from memory, look up similar situations in a separate tool or to manually scroll through the historical data for similar situations. In order to identify the optimal action to take, the operator clicks on the search button indicating that (s)he would like to find all situations most similar to the current state (i.e. a rise in the carbon monoxide indicated by the tag CO and drop in the temperature indicated by the tag T). The search instruction 60 gets sent over the LAN to the data processing device 80 where it gets transformed into a search parameter set 90. Meanwhile the relevant indexed process data 35 gets acquired by means of the data connection device 20. The data processing device 80 then performs the comparison method. The set of best matching situations are returned in the display 101 of the output device 100. By selecting the different matches the operator can see how the most similar cases evolved over time and for those for which a stabilization of the level of the carbon monoxide occurred (s)he can check whether certain actions were performed by adding the historical data of other tags and or event identifiers to the display as explained previously.

Another example of usage of the current invention is a process engineer who is asked to analyze the cause of a recent event, known to have occurred several times previously. The current practice forces the engineer to manually scroll through the historical data or to try and remember when a similar situation has occurred in the past. With the system of the current disclosure, the process engineer selects the recent event as the search instruction 60 by means of the selection possibilities in the input device 50. This can be understood by using the example presented above. The process engineer will select the same time frame as the operator and the CO and T tags. The process engineer then searches for the most similar matches throughout the entire historical data. This allows the process engineer to quickly amass information on all occurrences of said event.

Example 2

Batch Plant

Another example of the use of the current invention in a batch plant is now given. A process engineer might be interested to identify all past batches that are as similar as possible to an optimal batch, sometimes referred to as golden batch. Therefore the process engineer constructs a search instruction by selecting the known time frame of the golden batch and the set of relevant tags and event identifiers. The ability to automatically retrieve similar batches in the historical data can speed up the preparation time in order to perform a statistical analysis comparing the past transitions to the golden batch transition. Identifying similar behavior during a batch might also help in predicting the batch quality by analyzing the progress of the most similar batches.

A similar example in a batch plant is when an engineer is interested in studying transitions or changes between grades. To see how well a current transition follows transitions in the past, the ability to automatically retrieve similar transitions can significantly speed up the analysis time.

Example 3

Plastics Extrusion

Another example of the use of the current invention is for plastics extrusion. A plastics extruder uses a screw inside a heated barrel to melt raw plastic materials and form the raw materials into a continuous profile. The raw material in the extruder is heated to the desired melt temperature using three or more independent heater zones along the heated barrel, each of the three or more independent heater zones is controlled by a temperature PID-controller. Heat is also generated from friction between the raw material and the inside of the extruder screw and barrel. At the end of the extruder barrel, the melt passes through a screen pack, which holds back any contamination of the melt and provides back pressure, before leaving the extruder through a die. In addition to the temperatures along the barrel, the back pressure inside the extruder and the pressure drop over the screen pack are also monitored.

An increasing temperature anywhere along the barrel, or a change in the back pressure or the pressure drop, may indicate a problem with the raw material inside the barrel. Using the trends of the monitored temperatures and pressures, the operator can find occurrences of similar problems in the past, to help determine which particular problem is occurring, and what the operator can do to solve or mitigate the problem.

It is also possible that a problem causes the extruder to trip, i.e. shut down operation, in which case searching for similar profiles may significantly speed up the analysis of the cause of the trip.

What is claimed is:

1. A computer-implemented industrial process analysis system for analyzing industrial process events in an industrial process comprising:

a process data connection device for the acquisition of process data from one or more process data sources, wherein the process data comprises identifiers of sensors, a data set from the sensors, and time stamps;

a pre-processor for pre-processing the process data from selected ones of the process data sources and thus creating an expanded process data set, wherein the pre-processor is to interpolate the process data to obtain equidistantly sampled data points;

an indexing system for indexing the process data to create a set of indexed process data, wherein the set of indexed process data comprises a set of parameters per signal identifier and per time slice, and wherein the indexing system is to divide the process data into a plurality of time slices and calculating index values for the time slices characteristic of the process data in the time slice;

an input system for receiving at least one search instruction for a situation in the industrial process, wherein the search instruction comprises a search parameter set of one or more search parameters, wherein the search parameter set comprises a set of search parameters per signal identifier and per time slice, wherein the input system can further be to assign a weight value to each search parameter in the search parameter set, wherein the indexing system indexes the process data before the input system receives the least one search instruction;

a data processing device for processing the at least one search instruction to create a search parameter set and creating an aggregate weight value for the search parameters in the search parameter set, and calculating distances of search parameters of the search parameter set with corresponding members of the indexed process data to obtain a similarity value, wherein the calculated distances are weighted using the corresponding aggregate weight value to produce a similarity value, wherein the data processing device compares the distances between the parameters of the indexed process data and the search parameters of the search parameter set for corresponding time slices; and an output device to display results based on the similarity value, wherein the results are representative of the industrial process events in the industrial process similar to the situation, and thereby enabling an operator to learn optimal actions based on actions performed in the similar situations and the effects of those actions in those situations.

2. The system of claim 1, further comprising a pre-processor for pre-processing the process data and thus creating an expanded process data set.

3. The system of claim 1, further comprising at least one of a data historian or a data logger for supplying the process data.

4. The system of claim 1, wherein the comparing distances of members of the search parameter set with corresponding members of the indexed process data to obtain a similarity value comprises cumulating the distances of members of the search parameter set with corresponding members of the indexed process data and ranking the cumulated distances.

5. A computer-implemented method for analyzing industrial process events in an industrial process by comparing at least one search instruction for a situation in an industrial process with process data obtained from the industrial process comprising:
 acquiring process data from one or more process data sources, wherein the process data comprises identifiers of sensors, a data set from the sensors, and time stamps;
 pre-processing said process data from selected ones of said process data sources and thus creating an expanded process data set, wherein said pre-processing comprises interpolating the process data to obtain equidistantly sampled data points;
 indexing said process data to create a set of indexed process data, wherein the set of indexed process data comprises a set of parameters per signal identifier and per time slice and wherein the process data is divided into a plurality of time slices and index values are calculated for the time slices characteristic of the process data in the time slice;
 receiving at least one search instruction for a situation in the industrial process, wherein said process data is indexed before said at least one search instruction is received;
 converting the at least one search instruction to a search parameter set of one or more search parameters, wherein the search parameter set comprises a set of search parameters per signal identifier and per time slice;
 assigning a weight value to each search parameter in the search parameter set;
 calculating an aggregate weight value from the assigned weight values; accessing the set of indexed process data obtained by the indexing of the process data;
 comparing the search parameter set with the parameters of the indexed process data by calculating at the distances between the search parameters of the search parameter set and the corresponding parameters of the indexed process data for corresponding time slices and weighting the calculated distances using the corresponding aggregate weight value to obtain a similarity value;
 outputting at least one or more result based on the similarity value; and
 enabling an operator to learn optimal actions based on actions performed in actions performed in similar situations and the effects of those actions in those situations.

6. The method of claim 5, further comprising pre-processing the process data to create an expanded process data set having members at regular time intervals.

7. The method of claim 6, wherein the pre-processing comprises interpolating the process data to obtain equidistantly sampled data points.

8. The method of claim 5, further comprising dividing the process data into a plurality of time slices and calculating for the time slices index values characteristic of the process data in the time slice.

9. The method of claim 5, further comprising termination of the comparing if at least one of a cumulative distance exceeds a threshold value.

10. The method of claim 5, wherein the process data comprises identifiers of sensors, a data set from the sensors, and time stamps.

11. The method of claim 5, wherein the comparing of the search parameter set with the indexed process data comprises cumulating the distances of members of the search parameter set with corresponding members of the indexed process data and ranking the cumulated distances.

\* \* \* \* \*